(12) United States Patent
Deng et al.

(10) Patent No.: US 11,993,856 B2
(45) Date of Patent: May 28, 2024

(54) AMBIENT METHANE FUNCTIONALIZATION INITIATED BY D° METAL-OXO ELECTROCATALYST

(71) Applicant: THE REGENTS OF THE UNIVERSITY OF CALIFORNIA, Oakland, CA (US)

(72) Inventors: Jiao Deng, Los Angeles, CA (US); Chong Liu, Los Angeles, CA (US); Jesus Iniguez, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 10 days.

(21) Appl. No.: 17/636,333

(22) PCT Filed: Aug. 21, 2020

(86) PCT No.: PCT/US2020/047507
§ 371 (c)(1),
(2) Date: Feb. 17, 2022

(87) PCT Pub. No.: WO2021/035182
PCT Pub. Date: Feb. 25, 2021

(65) Prior Publication Data
US 2023/0175151 A1    Jun. 8, 2023

Related U.S. Application Data

(60) Provisional application No. 62/890,271, filed on Aug. 22, 2019.

(51) Int. Cl.
*C25B 3/03* (2021.01)
*B01J 19/08* (2006.01)
(Continued)

(52) U.S. Cl.
CPC .......... *C25B 11/075* (2021.01); *B01J 19/087* (2013.01); *C01G 31/006* (2013.01); *C25B 3/07* (2021.01);
(Continued)

(58) Field of Classification Search
CPC ................ C25B 3/03; C25B 3/23; C25B 3/25
(Continued)

(56) References Cited

U.S. PATENT DOCUMENTS

2019/0134609 A1    5/2019  Yamauchi et al.

OTHER PUBLICATIONS

Xie et al., "Selective Electrocatalytic Conversion of Methane to Fuels and Chemicals," Journal of Energy Chemistry (Nov. 1, 2018), vol. 27, No. 6, pp. 1629-1636. (Year: 2018).*

(Continued)

*Primary Examiner* — Edna Wong
(74) *Attorney, Agent, or Firm* — Foley & Lardner LLP

(57) ABSTRACT

The present disclosure relates generally to electrocatalytic process for conversion of a hydrocarbon reactant, comprising: introducing the hydrocarbon reactant into an acidic solution in a presence of a catalyst, wherein the catalyst includes a d° transition metal-oxo moiety; and applying an electrical input to the catalyst to convert the hydrocarbon reactant into a product. The present disclosure also relates to a catalyst for conversion of a hydrocarbon reactant, comprising a d° transition metal-oxo moiety and a sulfonic moiety bonded to the d° transition metal.

12 Claims, 25 Drawing Sheets

(51) Int. Cl.
    *C01G 31/00*     (2006.01)
    *C25B 3/07*     (2021.01)
    *C25B 3/23*     (2021.01)
    *C25B 3/25*     (2021.01)
    *C25B 11/075*     (2021.01)

(52) U.S. Cl.
    CPC ......... *C25B 3/23* (2021.01); *B01J 2219/0803* (2013.01); *B01J 2219/0884* (2013.01); *B01J 2219/0892* (2013.01)

(58) Field of Classification Search
    USPC .................................................. 205/462, 413
    See application file for complete search history.

(56) References Cited

OTHER PUBLICATIONS

O'Reilly et al., "Catalytic Methane Monofunctionalization by an Electrogenerated High-Valent Pd Intermediate," ACS Central Science (Nov. 22, 2017), vol. 3, No. 11, pp. 1174-1179. (Year: 2017).*
Chen et al., "Methane Oxidation over a V2O5 Catalyst in the Liquid Phase," Energy & Fuels (May 17, 2006), vol. 20, No. 3, pp. 915-918. (Year: 2006).*
Bełtowska-Brzezinska et al., "On Electrocatalysis in Alkene-Molybdenum (VI) System at Pt/Acidic Solution Interface," Journal of Solid State Electrochemistry (Jul. 2013), vol. 17, pp. 1815-1822. (Year: 2013).*
Foreign Search Report on PCT PCT/US2020/047507 dated Nov. 20, 2020.
Mu-Jeng, Cheng. "The Critical Role of Phosphate In Vanadium Phosphate Oxide for the Catalytic Activation and Functionalization of n-Butane to Maleic Anhydride" Journal of American Chemical Society, dated Feb. 24, 2013, pp. 4601-4603.
Soren B Rasmussen "Crystal Structure and Spectroscopic Characterization of KB(VO)2O(SO4)6" Inorganic Chemistry vol. 42, dated May 19, 2003, p. 7123-7128.
T. Maiyalagan, "Electrochemical oxidation of methanol on PW2O5-C composite catalysts", Chemistry, vol. 1, dated Jan. 25, 2009, pp. 433-436.
Unnikrishnan R.P Pillai, "Vanadium phosphorus oxide as an efficient catalyst for hydrocarbon oxidations using hydrogen peroxide" vol. 27 p. 525-528, dated Feb. 4, 2003.

* cited by examiner

A Biology

Ambient, $E_a$ = 4.2 ~ 12.9 kcal/mol

B Homogeneous catalysis

34 ~ 75 bar, elevated temperature
$E_a$ = 34 ~ 36 kcal/mol

C Electrocatalysis

Usually > 30 bar, elevated temperature
Low selectivity at 1 bar

D This work

Ambient, F. E. ~ 85%, $E_a$ = 10.8 kcal/mol, earth-abundant catalyst

Ambient, TON > 100,000, F. E. ~ 90%, Cat. stability > 240 hr

E Proposed mechanism

A Possible structures of 1 based on DFT calculations

1a $\Delta G_{rel}$ = 0 kcal·mol$^{-1}$

1b $\Delta G_{rel}$ = +1.2 kcal·mol$^{-1}$

D Fitting results from EXAFS

| Shell | C. N. | R (Å) |
|---|---|---|
| V–O | 1.1 (0.1) | 1.58 (0.01) |
| V–O | 1.2 (0.1) | 1.68 (0.02) |
| V–O | 3.0 (0.1) | 1.96 (0.01) |
| V–S | 1.0 (0.4) | 2.73 (0.05) |
| V–S | 2.0 (0.2) | 3.13 (0.07) |
| V–V | 1.0 (0.2) | 3.27 (0.05) |

$V_2^{V,V}$, 1a (HOMO) → $V_2^{V,VI \cdot +}$, 2 (LUMO*) → H-atom abstraction, No significant barrier Overall reaction: $CH_4 + H_2SO_4 \xrightarrow[98\% H_2SO_4]{1, 25\ °C} CH_3OSO_3H + 2\ e^- + 2\ H^+$

AMBIENT METHANE FUNCTIONALIZATION INITIATED BY D⁰ METAL-OXO ELECTROCATALYST

CROSS-REFERENCE TO RELATED APPLICATIONS

This application is a U.S. National Phase Application under 35 U.S.C. § 371 of International Application No. PCT/US2020/047507, filed on Aug. 21, 2020, which claims the benefit of U.S. Provisional Patent Application No. 62/890,271, filed Aug. 22, 2019, which are incorporated by reference herein in their entirety.

SUMMARY

The abundant yet widely distributed methane ($CH_4$) resources specify a demand for efficient conversion of $CH_4$ into liquid chemicals at ambient conditions with a minimal infrastructure support. Electrochemistry could be a possible strategy because electrochemical charge transfer is capable of generating intermediates with high reactivity that may not be accessible in solution catalysis. However, ambient, selective electrochemical activation of $CH_4$ has not been demonstrated yet. Some embodiments are directed to an electricity-driven $CH_4$ functionalization at room temperature and ambient pressure via a $d^0$ metal-oxo catalyst. Examples of electrochemical catalysts are titanium (IV)-oxo, vanadium (V)-oxo, or chromium (VI)-oxo. Demonstration is made that the use of $d^0$ metal-oxo in an electrochemical system realizes $CH_4$ functionalization at room temperature and ambient pressure with low activation energy (Ea) and large turnover numbers (TONs). In particular, use is made of about 0.1-10 mM vanadium (V)-oxo in about 98% $H_2SO_4$ to electrochemically catalyze $CH_4$ functionalization into methyl bisulfate ($CH_3OSO_3H$), a methanol derivative. It is found that a linearly increasing calculated TON as a function of electrolysis duration to reach about 45,000 in about 72 hours without signs of catalyst degradation. At about 1-bar and about 3-bar $CH_4$ pressures, the turnover frequencies (TOFs) of about 483 $hr^{-1}$ and about 1336 $hr^{-1}$ as well as the Faradaic efficiencies (F. E.) of about 63.5% and about 84.5% are obtained. Similar total TOF values of about 532 $hr^{-1}$ and about 964 $hr^{-1}$ for about 1-bar $C_2H_6$ and about 1-bar $C_3H_8$ functionalization allows the use of electricity to convert real natural gas mixtures into liquid chemicals at ambient conditions without much upstream separation. The TONs of oxidation products, predominantly from $CH_4$, $C_2H_6$, and $C_3H_8$ in the natural gas supplied via pipeline by SoCalGas, reached about 107,000, about 9,300, and about 200 within about 240 hours, and the steady-state F. E. of all liquid products was about 90%. Electrokinetic analysis showed a turnover-limiting step (TLS) of one-electron oxidation of vanadium (V)-oxo catalyst leads to a first-order kinetic of $CH_4$ functionalization with Ea as low as about 10.8 kcal/mol. In the TLS, oxygen radical cation was generated in the sulfonic ligand of vanadium (V)-oxo catalyst, which is reactive towards $CH_4$. The catalytic system remains active towards $CH_4$ functionalization in aqueous solution with $H_2SO_4$ concentrations as low as about 68%. The catalytic system can be translated into heterogeneous electrocatalysis with similar responses of ambient $CH_4$ activation for streamlined product separation. Based on these results, this new catalytic system can realize the potential application of liquefying and converting $CH_4$ (and natural gas) into commodity, valuable chemicals at the site of emission in remote locations, such as oil rigs, with minimal infrastructure support at remote locations, and can reduce the emission of green-house gases into the atmosphere, which is beneficial for the environment and sustainability.

BRIEF DESCRIPTION OF THE DRAWINGS

FIGS. 1A, 1B, and 1C show representative examples of biological, homogeneous, and electrocatalytic functionalization of $CH_4$ in comparison with (FIG. 1D) the reported approach of V-oxo dimer (1) catalyst. FIG. 1E shows a potential catalytic cycle of electrocatalytic $CH_4$ activation with catalyst 1. MMO, methane monooxygenases; Ea, activation energy; Cat., catalyst; ROS, reactive oxygen species; F. E., Faradaic efficiency; TON, turnover number; TLS, turnover-limiting step.

(FIG. 2A) Cyclic voltammograms and (FIG. 2B) $^1$H NMR spectra of liquid samples after about 6-hr electrolysis for about 10 mM 1 in about 1-bar $CH_4$ (red), about 10 mM 1 in about 1-bar $N_2$ (blue), and blanks without 1 (black). Dashed blue, current density (j) of blue trace magnified by a factor of 10. *, internal standard acetic acid. (FIG. 2C) $^{13}$C NMR spectra of samples before the electrolysis (black), after about 3-hr and about 6-hr electrolysis with $^{13}CH_4$ (red) and $CH_4$ of natural abundance (blue), respectively. (FIG. 2D) Calculated turnover number (TON, red) and electric charges passed (blue) versus the duration of electrolysis. (FIG. 2E) Faradaic efficiencies of $CH_4$ activation in about 10 mM 1 versus electrode potential E under about 1-bar $N_2$ (green), about 1-bar $CH_4$ (blue) and about 3-bar $CH_4$ (red). (FIG. 2F) Cumulative TONs for $C_1$ product from $CH_4$ (red), for $C_2$ product from $C_2H_6$ (green, multiplied by a factor of 5), and for $C_3$ product from $C_3H_8$ (black, multiplied by a factor of 50) as well as total liquid product F. E. values (blue) are plotted against the duration of bulk electrolysis. TON values for $CH_3OSO_3H$ as $C_1$ product (red), $CH_3COOH$ and $C_2H_5OSO_3H$ as $C_2$ product (green), and $CH_3COCH_3$ as $C_3$ product (black) within about 240 hours are shown in the right bar graph, respectively. Trace products beyond $C_3$ were also observed. About 100 mV $s^{-1}$ and Pt working electrode in A; FTO working electrode in B to F, and E=about 2.255 V vs. $Hg_2SO_4$/Hg in B to D, and F.

(FIG. 3A) The logarithmic of partial current density for $CH_4$ activation, log($j_{CH4}$), versus the logarithmic of 1's concentration, log([1]). (FIG. 3B) log($j_{CH4}$) versus E under $CH_4$ pressures of about 1 bar (blue) and about 3 bar (red) with the fitted Tafel slopes displayed. (FIG. 3C) log($j_{CH4}$) (red) versus the logarithmic of $CH_4$ pressure, log($p_{CH4}$). (FIG. 3D) The natural logarithmic of partial current density for $CH_4$ activation, ln($j_{CH4}$), versus inverse of temperature, $T^{-1}$, at about 1.955 V (black), about 2.005 V (blue), and about 2.055 V (red) vs. $Hg_2SO_4$/Hg, respectively. The corresponding apparent activation energies (Ea) are displayed. Unless noted specifically, about 25° C., about 10 mM 1 in about 98% $H_2SO_4$, E=about 2.255 V vs. $Hg_2SO_4$/Hg, $p_{CH4}$=about 1 bar, with data recorded from about 6-hr bulk electrolysis.

(FIG. 4A) Calculated possible isomers of 1 and their relative energy stability. (FIG. 4B) Normalized intensity of V K-edge X-ray absorption near-edge structure (XANES) and (FIG. 4C) normalized extended X-ray absorption fine structure (EXAFS) for 1 (solid red), $V_2O_5$ (dashed blue), and metallic V (dashed yellow). (FIG. 4D) Calculated coordination number (C. N.) and the distance (R) away from V atom based on EXAFS results. (FIG. 4E) Calculated frontier orbitals involved in the TLS and the proposed transition state of C—H activation step. HOMO, highest occupied molecular orbital; LUMO, lowest unoccupied molecular orbital. *, designated when considering spin-orbital coupling, equivalent to singly occupied molecular orbital (SOMO) in restricted formalism.

It should be noted that the representative illustrations provided in the figures set forth herein is intended to illustrate the general features and/or characteristics of exemplary embodiments to aid in describing the present technology in full. The figures may not precisely reflect the characteristics of any given embodiment, and are not necessarily intended to define or limit the scope of the claimed subject matter. Further, the present technology may or may not include or incorporate therewith any one or more features of characteristics set provided in any one or more figures.

DETAILED DESCRIPTION

It is to be appreciated that certain aspects, modes, embodiments, variations, and features of the present methods are described below in various levels of detail in order to provide a substantial understanding of the present technology.

The present disclosure is directed, in part, to an electrocatalytic process for conversion of a hydrocarbon reactant. In some embodiments, an electrocatalytic process for conversion of a hydrocarbon reactant includes (1) introducing the hydrocarbon reactant into an acidic solution in a presence of a catalyst, wherein the catalyst includes a $d^0$ transition metal-oxo (or =O) moiety; and (2) applying an electrical input to the catalyst to convert the hydrocarbon reactant into a product. In some embodiments of the electrocatalytic process, the $d^0$ transition metal is selected from Group 3, Group 4, Group 5, Group 6, and Group 7 of the periodic table. In some embodiments of the electrocatalytic process, the $d^0$ transition metal is selected from titanium (IV), vanadium (V), and chromium (VI). In some embodiments of the electrocatalytic process, the catalyst further includes at least one of a sulfonic moiety (or —OSO$_3$H) or a trifluoromethanesulfonic moiety (or —OSO$_2$CF$_3$) bonded to the $d^0$ transition metal.

In some embodiments of the electrocatalytic process, the catalyst includes a dimer of $d^0$ transition metal molecules. In some embodiments of the electrocatalytic process, the catalyst includes a vanadium (V)-oxo dimer. In some embodiments, the dimer includes at least one of a sulfonic moiety (or —OSO$_3$H) or a trifluoromethanesulfonic moiety (or —OSO$_2$CF$_3$) bonded to one $d^0$ transition metal molecule. In some embodiments, the dimer includes at least one of a sulfonic moiety (or —OSO$_3$H) or a trifluoromethanesulfonic moiety (or —OSO$_2$CF$_3$) bonded to two $d^0$ transition metal molecules. In some embodiments of the electrocatalytic process, the catalyst has a chemical formula:

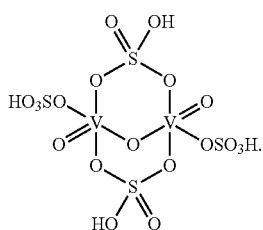

Figure 17:
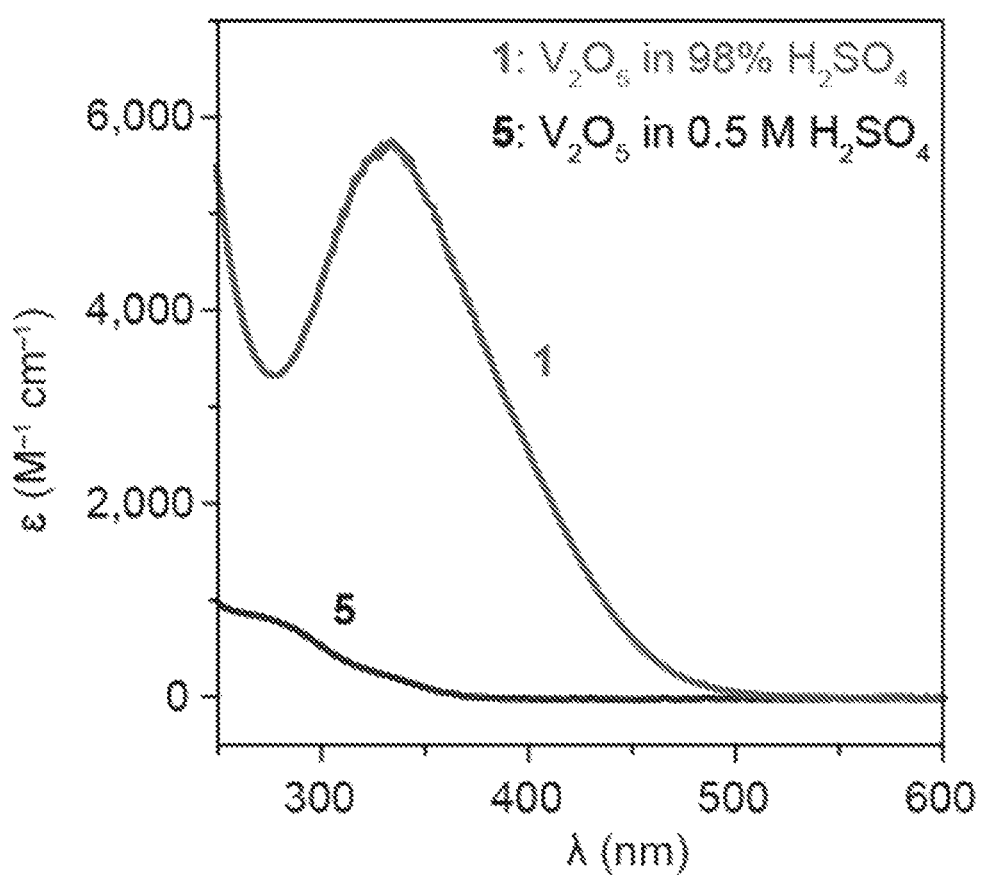
FIG. 17 shows molar absorption coefficients of catalyst 1, prepared by dissolving $V_2O_5$ in about 98% $H_2SO_4$, as well as the monometallic $VO_2^+$ species (5) prepared by dissolving $V_2O_5$ in about 0.5 M $H_2SO_4$. The concentrations of vanadium elements are about 0.4 mM in both cases.
Figure 18:
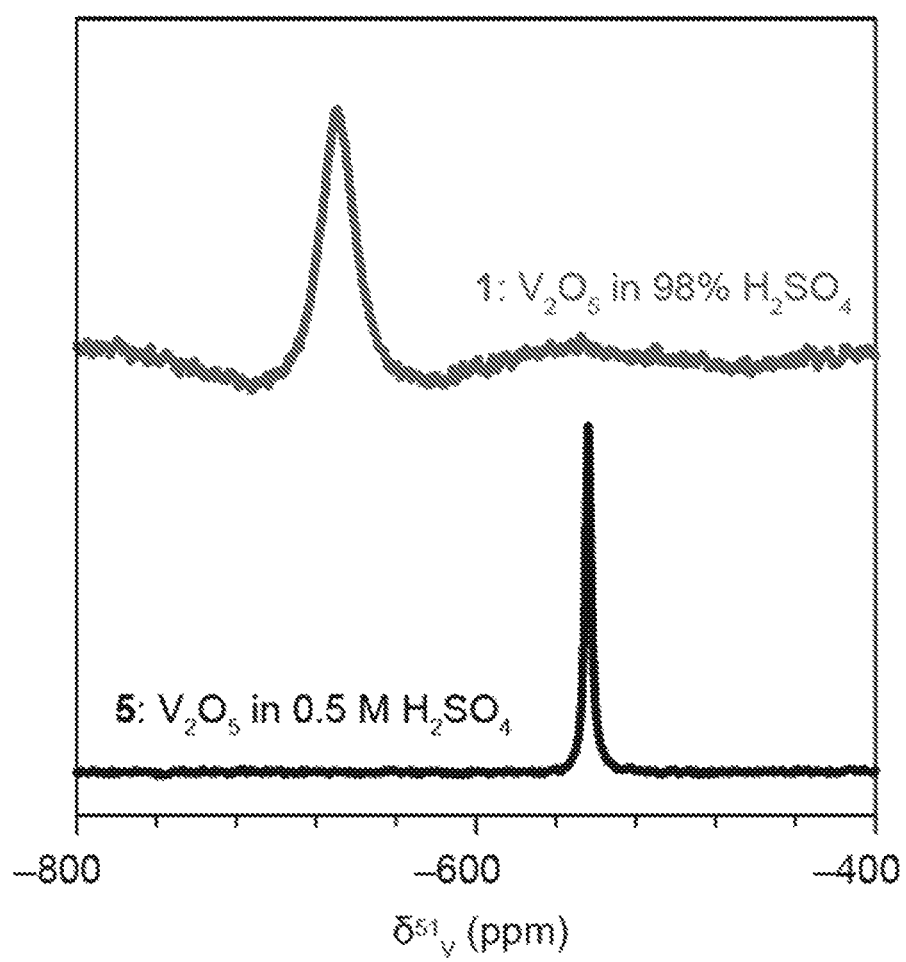
FIG. 18 shows $^{51}V$ NMR spectrum of catalyst 1, prepared by dissolving $V_2O_5$ in about 98% $H_2SO_4$, as well as the monometallic $VO_2^+$ species (5) prepared by dissolving $V_2O_5$ in about 0.5 M $H_2SO_4$. The concentrations of vanadium elements are about 10 mM in both cases.

In some embodiments of the electrocatalytic process, the catalyst is a vanadium compound displaying an optical absorption substantially similar to that in FIG. 17, and/or a $^{51}$V NMR spectrum substantially similar to that in FIG. 18. In some embodiments of the electrocatalytic process, the catalyst is a $d^0$ vanadium (V)-oxo species obtained by a process comprising dissolving V$_2$O$_5$ in H$_2$SO$_4$. In some embodiments, the process also comprises electrochemically oxidizing the resulting material.

In some embodiments of the electrocatalytic process, a concentration of the catalyst in the acidic solution is in a range of about 0.1 mM to about 100 mM, about 0.1 mM to about 50 mM, or about 0.1 mM to about 10 mM.

In some embodiments of the electrocatalytic process, the catalyst is vanadium (V) phosphate. In some embodiments, the catalyst is VOPO$_4$·2H$_2$O.

In some embodiments of the electrocatalytic process, the acidic solution is an aqueous solution. In some embodiments, the aqueous solution includes sulfuric acid. In some embodiments, a concentration of sulfuric acid in the aqueous solution is about 60% (mass/mass) or greater, such as about 68% to about 98%, about 80% to about 98%, or about 90% to about 98%.

In some embodiments of the electrocatalytic process, applying the electrical input is carried out at a temperature in a range of up to about 200° C. or less, such as about 10° C. to about 200° C., about 10° C. to about 100° C., about 10° C. to about 50° C., or about 25° C. In some embodiments of the electrocatalytic process, applying the electrical input is carried out at a pressure in a range of up to about 50 bar or less, such as about 0.5 bar to 50 bar, about 0.5 bar to about 30 bar, about 0.5 bar to about 10 bar, about 0.5 bar to about 5 bar, or about 1 bar. In some embodiments of the electrocatalytic process, the hydrocarbon reactant includes methane.

In some embodiments, the product includes at least one of methyl bisulfate or methanol. In some embodiments of the electrocatalytic process, the hydrocarbon reactant is a hydrocarbon mixture. In some embodiments, the hydrocarbon mixture is natural gas. In some embodiments, the product includes at least one of methyl bisulfate or methanol. In some embodiments, the product further includes at least one of acetic acid or ethyl bisulfate. In some embodiments, the product further includes at least one of isopropyl bisulfate or acetone.

The present disclosure is directed, in part, to an a catalyst is provided for conversion of a hydrocarbon reactant. In some embodiments, the catalyst is provided for conversion of a hydrocarbon reactant and the catalyst includes a $d^0$ transition metal-oxo moiety and at least one of a sulfonic moiety or a trifluoromethanesulfonic moiety bonded to the $d^0$ transition metal. In some embodiments of the catalyst, the $d^0$ transition metal is selected from Group 3, Group 4, Group 5, Group 6, and Group 7 of the periodic table. In some embodiments of the catalyst, the $d^0$ transition metal is selected from titanium (IV), vanadium (V), and chromium (VI).

In some embodiments, the catalyst includes a dimer of $d^0$ transition metal molecules. In some embodiments, the catalyst includes a vanadium (V)-oxo dimer. In some embodiments, the dimer includes at least one of a sulfonic moiety (or —OSO$_3$H) or a trifluoromethanesulfonic moiety (or —OSO$_2$CF$_3$) bonded to one $d^0$ transition metal molecule. In some embodiments, the dimer includes at least one of a sulfonic moiety (or —OSO$_3$H) or a trifluoromethanesulfonic moiety (or —OSO$_2$CF$_3$) bonded to two $d^0$ transition metal molecules. In some embodiments of the catalyst, the catalyst has a chemical formula:

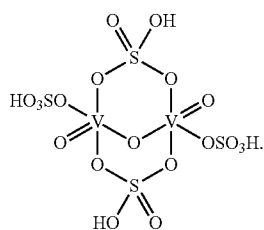

In some embodiments, the catalyst is a vanadium compound displaying an optical absorption substantially similar to that in FIG. 17, and/or a $^{51}$V NMR spectrum substantially similar to that in FIG. 18. In some embodiments, the catalyst is a $d^0$ vanadium (V)-oxo species obtained by a process comprising dissolving V$_2$O$_5$ in H$_2$SO$_4$. In some embodiments, the process also comprises electrochemically oxidizing the resulting material.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Example 1: Ambient Methane Functionalization Initiated by Electrochemical Oxidation of a Vanadium (V)-Oxo Dimer Overview:

The abundant yet widely distributed methane resources specifies a demand for efficient conversion of methane into liquid chemicals, whereas selective processes at ambient conditions with minimal infrastructure support have yet to be demonstrated. Herein, this example reports electricity-driven functionalization of methane at room temperature and ambient pressure with earth-abundant vanadium (V)-oxo dimer molecule as a catalyst. Selective two-electron oxidation of methane was achieved electrochemically with an activation energy as low as about 10.8 kcal/mol and a turnover frequency up to about 1300 hr$^{-1}$. This water-tolerant catalyst liquefies natural gas mixture under ambient conditions over about 240 hours with about 90% selectivity and turnover numbers exceeding about 100,000. A turnover-limiting one-electron removal from the dimer leads to near-barrier-less C—H activation. The proposed mechanism seems generally applicable and represents a new strategy to electrochemically functionalize $CH_4$.

Figure 1:
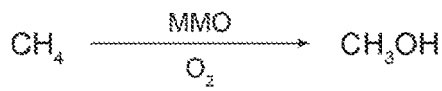
FIG. 1 shows pathways of $CH_4$ functionalization.
Figure 1:
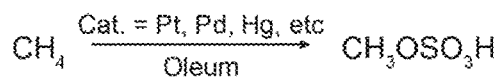
Figure 1:
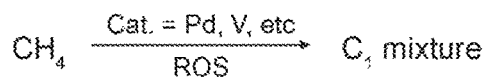
Figure 1:
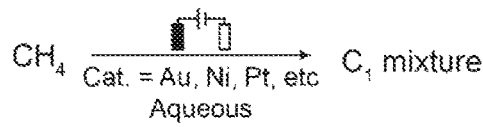
Figure 1:
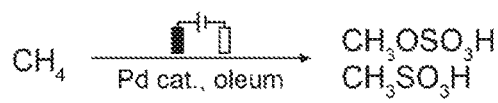
Figure 1:
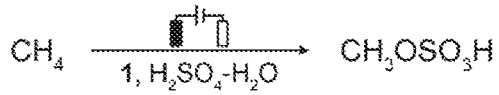
Figure 1:
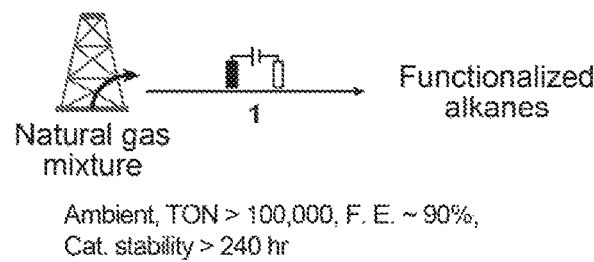
Figure 1:
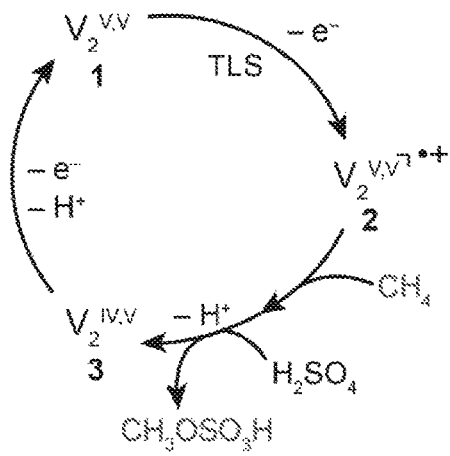

Results and Discussion:

The wide geological distribution of natural gas resources leads to an undesirable loss of methane ($CH_4$) especially at remote locations via flaring or direct emission into the atmosphere. One possible strategy to mitigate such an issue is to convert $CH_4$ into liquid chemicals at the source of emission under ambient condition with minimal reliance on an industrial infrastructure. Fundamentally, this catalytic conversion specifies low activation energy and high turnover numbers, in order to accommodate the low thermal energy and partial pressure of $CH_4$ substrate at ambient condition. A variety of processes of $CH_4$ functionalization have been investigated (FIG. 1). In biology, the methane monooxygenases (MMO) activate $CH_4$ with activation energies of about 4.2 to about 12.9 kcal/mol at ambient conditions (FIG. 1A). Yet other synthetic approaches of $CH_4$ functionalization usually operate at high pressure and/or elevated temperature. The production of syngas from $CH_4$ via gas-phase reactions operates at about 650° C. and about 30 bar. Solution-phase activation of $CH_4$ (FIG. 1B) have been proposed with organometallic electrophilic species, reactive oxygen radicals, as well as carbocations generated from superacids. In these reactions the relatively low reactivity of intermediates towards $CH_4$ activation involves high temperatures to overcome kinetic barriers, as well as high $CH_4$ pressure for enhanced reaction rate.

It is posited that an ambient, selective $CH_4$ activation is possible with the use of electrochemistry, because electrochemical charge transfer is capable of generating transient intermediates with high reactivity and selectivity, which may not be accessible in solution catalysis at room temperature. Some progress is made in this direction (FIG. 1C). An electrochemically generated $Pd_2^{III,III}$ dimer is proposed to activate $CH_4$ in oleum at about 70 to about 140° C. and about 34-bar $CH_4$. The Shilov's catalyst can be driven electrochemically for multi-electron oxidation of $CH_4$ at about 130° C. and about 47-bar $CH_4$. Pd—Au—Cu catalyst loaded on carbon black initiated electrochemical $CH_4$ oxidation at about 250° C. Nickel oxide is proposed to electrochemically oxidize $CH_4$ at about 85° C. with a selectivity lower than about 5%. Thus, ambient, selective electrocatalytic activation of $CH_4$ remains to be demonstrated. Herein, this example reports a selective electrochemical $CH_4$ functionalization to methyl bisulfate ($CH_3OSO_3H$), a methanol derivative, with an earth-abundant vanadium (V)-oxo dimer ($V_2^{V,V}$, 1) catalyst at room temperature and ambient pressure of $CH_4$ (FIG. 1D). The proposed mechanism affords a turnover-limiting one-electron oxidation of 1 that yields a reactive cation radical (2), followed by a step of C—H bond activation without significant kinetic barriers (FIG. 1E). The electrochemical catalyst enjoys low activation energies in $H_2SO_4$—$H_2O$ mixed solvent and is able to functionalize natural gas mixture without much upstream treatment for over about 240 hrs (FIG. 1D).

Figure 2:
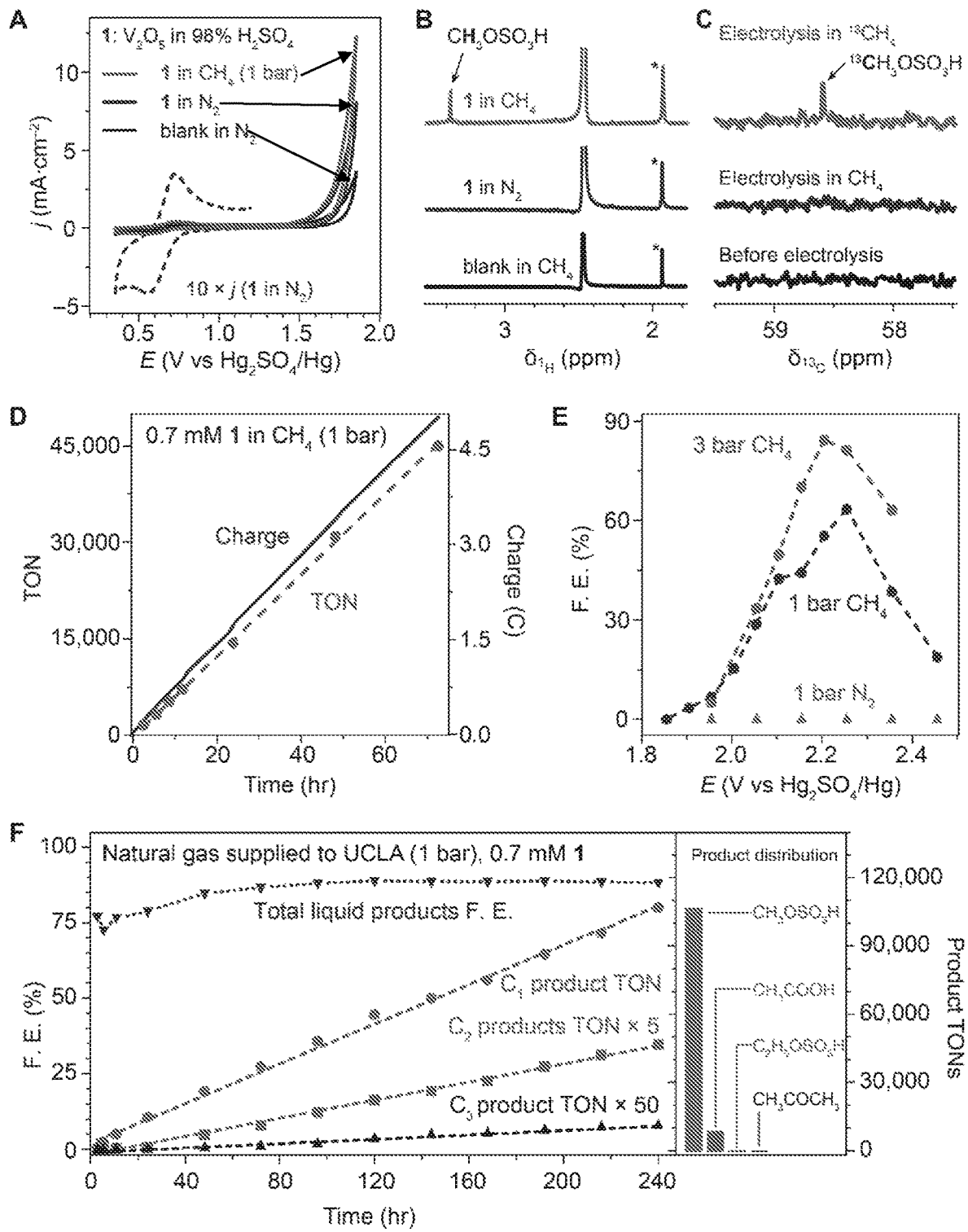
FIG. 2 shows electrochemical functionalization of $CH_4$ and natural gas mixture.
Figure 5:
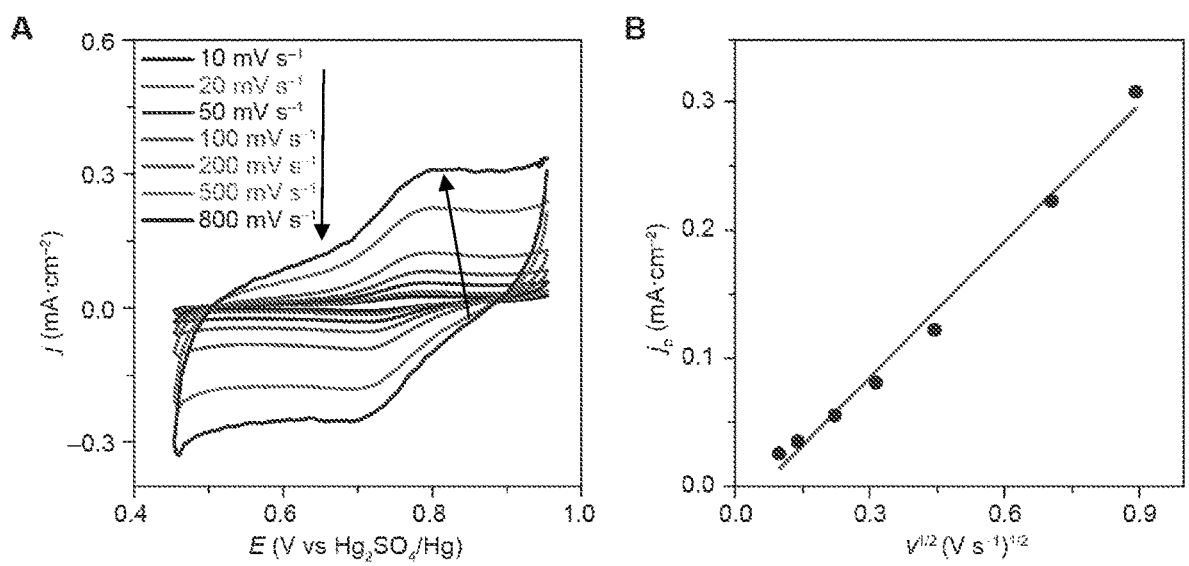
FIG. 5A shows cyclic voltammograms of about 1 mM 1 at different scan rates varying from about $10\, mV \cdot s^{-1}$ to about $800\, mV \cdot s^{-1}$.
(FIG. 5B) Oxidative peak current density ($j_p$) versus the square root of scan rate (v). The linear correlation between $j_p$ and $v^{1/2}$ leads to the determination of diffusion coefficient D for species 1.
Figure 6:
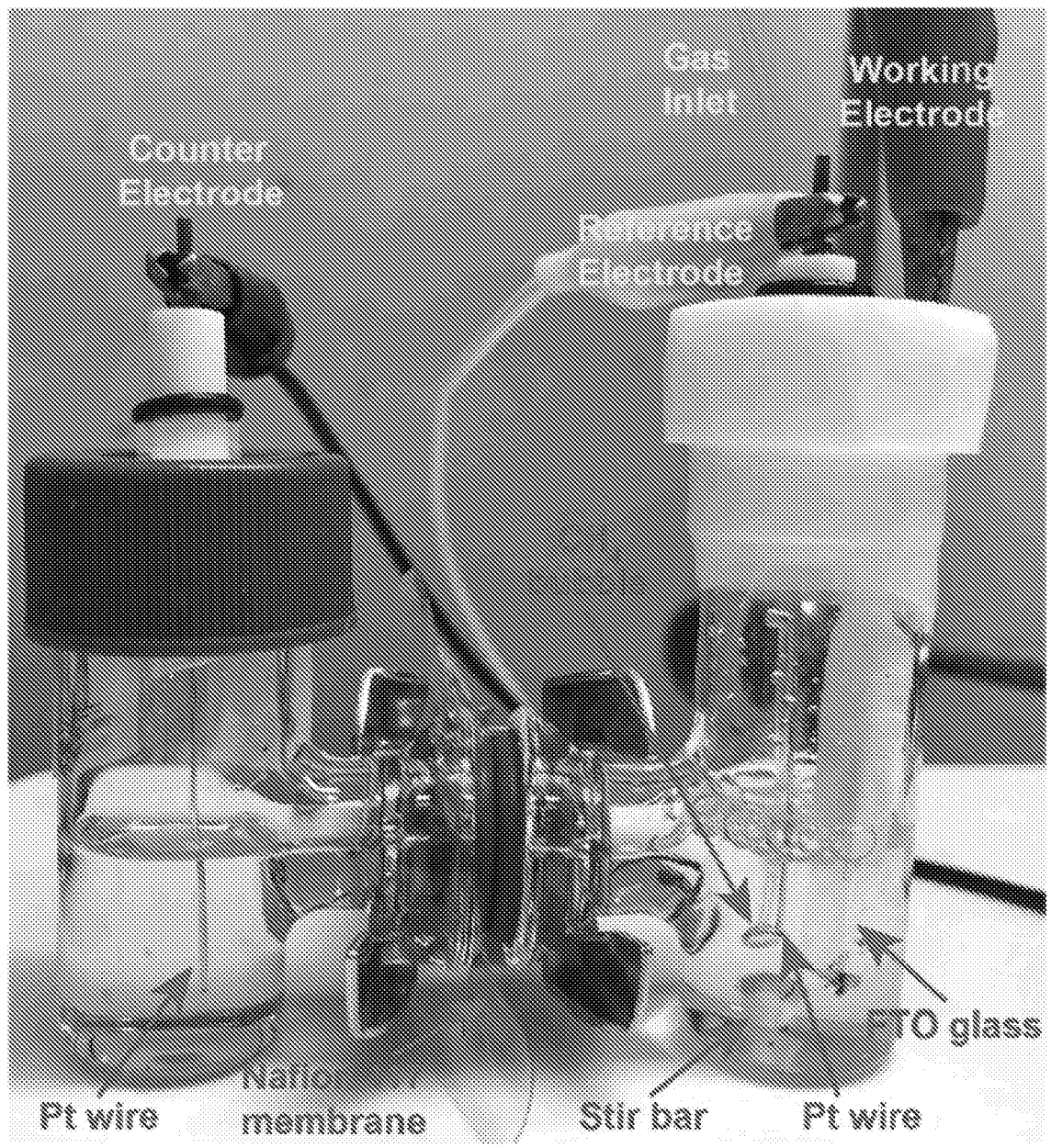
FIG. 6 shows a schematic illustration of two-chamber electrochemical cell for bulk electrolysis with $CH_4$. Nafion 117 membrane as the separator, a piece of commercial fluorine-doped tin-oxide (FTO) glass as the working electrode, two Pt wires as the pseudo-reference electrode and counter electrode, respectively.
Figure 7:
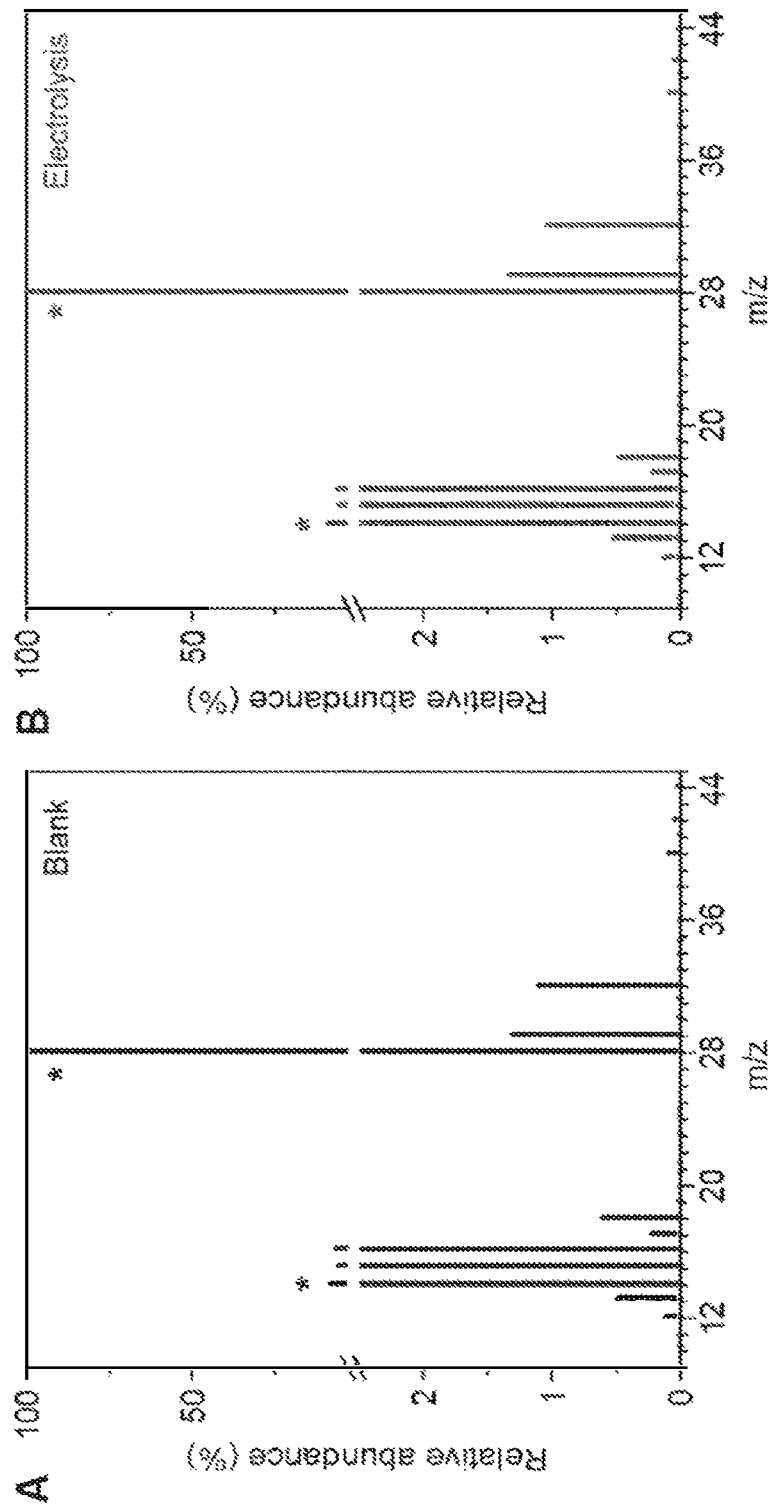
FIG. 7 shows MS results of the manually inject gaseous samples before electrolysis as blank (A) and during electrolysis (B) (about 1-bar $CH_4$, about 10 mM 1, E=about 2.225 V vs. $Hg_2SO_4/Hg$). All the m/z peaks were monitored at a retention time of about 3.3 min in the GC-MS. *, peaks correspond to the presence of $N_2$. The possible formation of CO and $CO_2$ as gas products were not confirmed within the detection limit.
Figure 8:
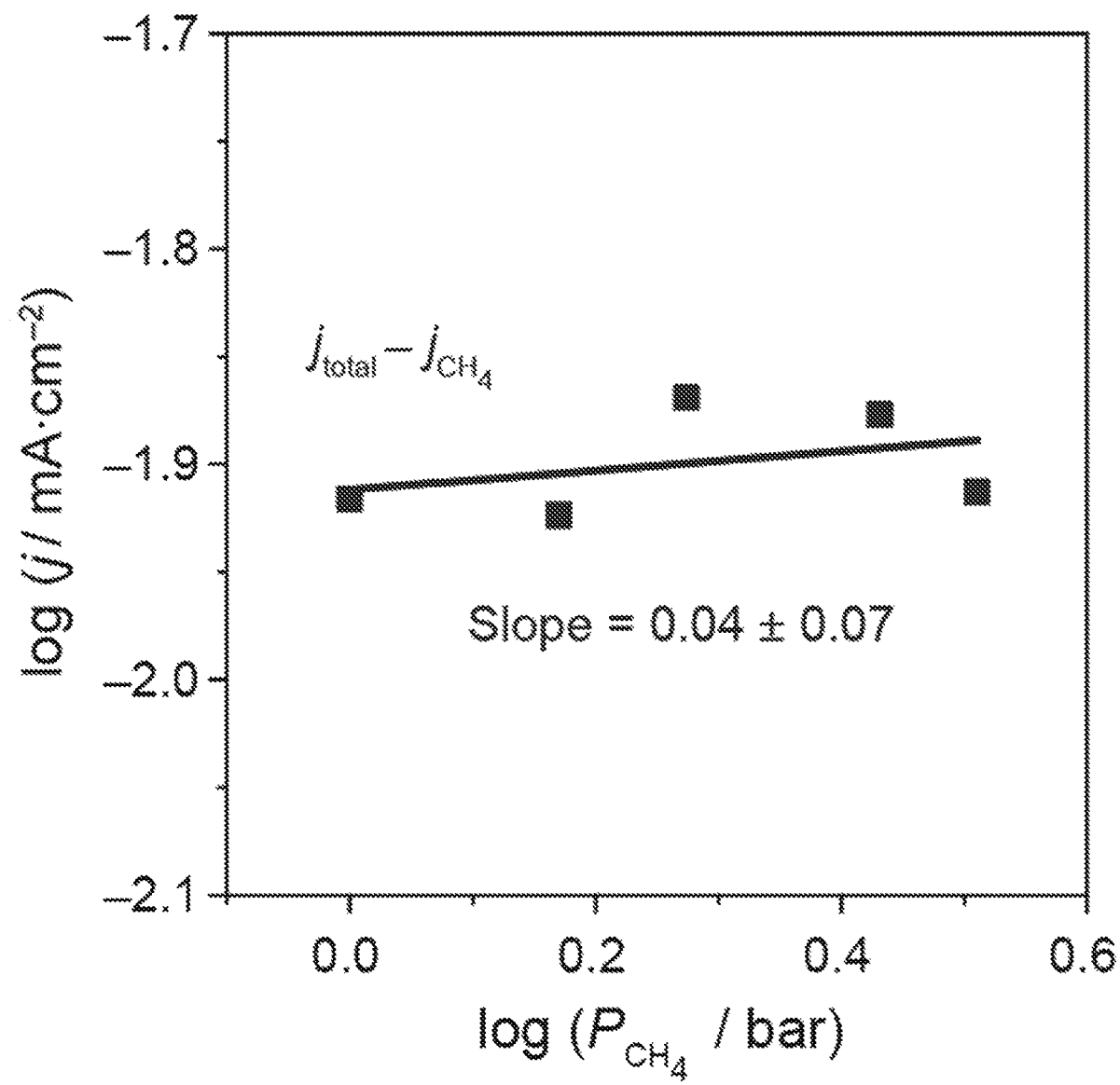
FIG. 8 shows the logarithmic of current density that does not active $CH_4$, $\log(j_{total}-j_{CH4})$ versus the logarithmic of $CH_4$ pressure, $\log(p_{CH4})$.
Figure 9:
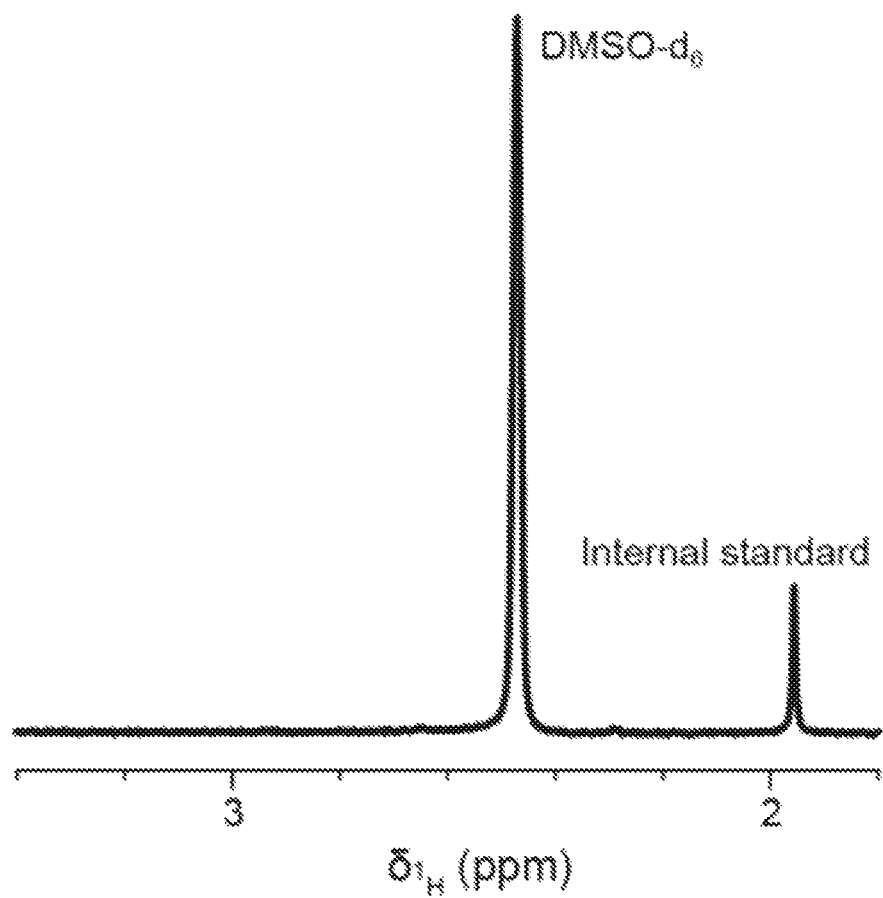
FIG. 9 shows $^1H$ NMR spectrum of liquid sample after about 6-hr bulk electrolysis. E=about 1.855 V vs. $Hg_2SO_4/Hg$, about 1-bar $CH_4$, about 10 mM 1.
Figure 10:
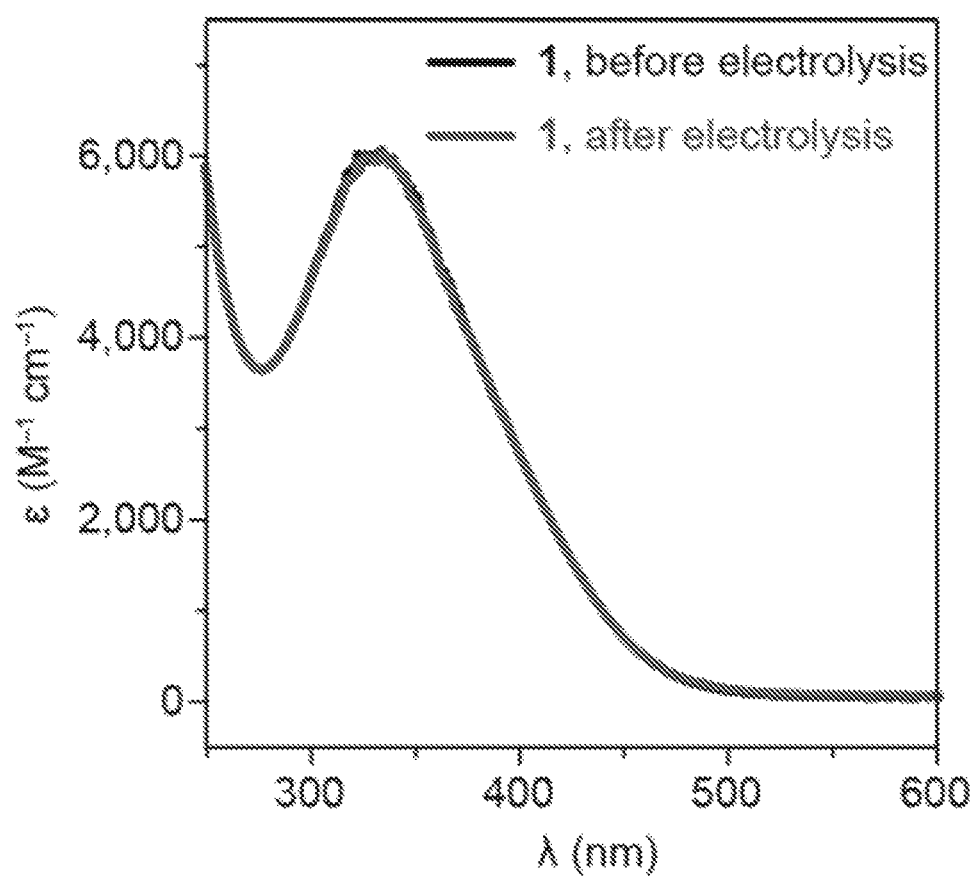
FIG. 10 shows molar absorption coefficients of electrolytes containing 1 before (black) and after (red) about 6-hr electrolysis. E=about 2.105 V vs. $Hg_2SO_4/Hg$, about 1-bar $CH_4$, about 10 mM 1. The absorption spectra were recorded after about 25-times dilution in order to avoid saturating the detector.

It is determined that d$^0$ vanadium (V)-oxo species (1), prepared by dissolving $V_2O_5$ in about 98% $H_2SO_4$, can be electrochemically oxidized further and displayed catalytic $CH_4$ functionalization at room temperature and ambient pressure. Cyclic voltammograms of about 10 mM 1 in about 98% $H_2SO_4$ under about 1-bar dinitrogen (Na) (blue), about 1-bar $CH_4$ (red) and a blank control (black) are displayed in FIG. 2A at about 25° C. on a platinum (Pt) working electrode. A quasi-reversible peak corresponding to $V^V/V^{IV}$ redox couple was observed with a midpoint potential $E_{1/2}$=about 0.644 V vs. $Hg_2SO_4$/Hg reference electrode, with a diffusion coefficient D=about 2.18×10$^{-11}$ m$^2$/S for 1 based on Randles-Savcik analysis (FIG. 5). An additional oxidation current was observed for 1 at the electrochemical potential E>about 1.6 V vs. $Hg_2SO_4$/Hg, and such an oxidation current is larger in $CH_4$ than in $N_2$. This observation indicates that 1 can be further oxidized electrochemically and $CH_4$ reacts with the resultant oxidized species. Bulk electrolysis in about 98% $H_2SO_4$ under about 1-bar $CH_4$ was conducted at E=about 2.255 V vs. $Hg_2SO_4$/Hg for about 6 hrs with an electrode of fluorine-doped tin oxide (FIG. 6). The liquid composition after electrolysis were analyzed by $^1$H and $^{13}$C nuclear magnetic resonance (NMR) spectroscopy. $CH_3OSO_3H$, which yields methanol after hydrolysis, was observed at chemical shift δ=3.34 ppm in $^1$H NMR after electrolysis with about 10 mM 1 under $CH_4$ (red in FIG. 2B). No gaseous or liquid products other than $CH_3OSO_3H$ were observed as a product of $CH_4$ oxidation within the detection limit (FIG. 7 and FIG. 8). Organic products were not detected in the absence of 1 under $CH_4$ (black), with about 10 mM 1 under Na (blue in FIG. 2B), or at a less anodic potential (E=about 1.855 V vs. $Hg_2SO_4$/Hg) (FIG. 9). These data confirm that $CH_4$ undergoes a two-electron oxidation into $CH_3OSO_3H$ that is initiated with the electrochemical oxidation of 1. Isotope-labelling experiments are conducted by introducing $^{13}CH_4$ as the substrate at about 1-bar pressure. The introduction of $^{13}CH_4$ in lieu of $CH_4$ of natural abundance leads to the surge of $^{13}CH_3OSO_3H$ signal at δ=58.6 ppm in $^{13}C$ NMR after electrolysis (FIG. 2C). The optical absorption spectra of the solution before and after electrolysis were identical to each other (FIG. 10), implying that 1 as a catalyst was regenerated after electrolysis.

The electrocatalysis with 1 is durable and selective for functionalization of $CH_4$ with high turnover numbers (TONs) and turnover frequencies (TOFs). Bulk electrolysis was conducted with about 0.7 mM 1 at about 25° C. under about 1-bar pressure of $CH_4$. Liquid aliquots at different time points were analyzed, and the electrochemical TONs were calculated based on the developed method. FIG. 2D displays the amount of electric charge and the calculated TONs as a function of electrolysis duration. A linear correlation indicates a durable catalyst of TON up to about 45,000 in about 72 hrs without signs of catalyst degradation. Investigation is made of the Faradaic efficiency (F. E.), specified as the selectivity of converting $CH_4$ into $CH_3OSO_3H$ based on the amount of electric charge, as function of E at about 25° C. In about 10 mM 1 (FIG. 2E), the absence of $CH_4$ leads to no product formation (green), and under about 1 bar $CH_4$ an optimal F. E.=about 63.5% when E=about 2.255 V vs. $Hg_2SO_4$/Hg (blue). It is found that the reaction selectivity is constrained by the mass transport and a finite solubility of $CH_4$ in solvent (about 1 mM). When $CH_4$ pressure increased to about 3 bar, the optimal F. E.=about 84.5% at E=about 2.205 V vs. $Hg_2SO_4$/Hg (red in FIG. 2E). The corresponding TOFs of 1 as an electrocatalyst are about 483 and about 1336 $hr^{-1}$ for $CH_4$ at about 1-bar and about 3 bar pressures, respectively. The measured TOF values at room temperature compare favorably with other catalysts at elevated temperatures and pressures (Table 1).

Figure 11:
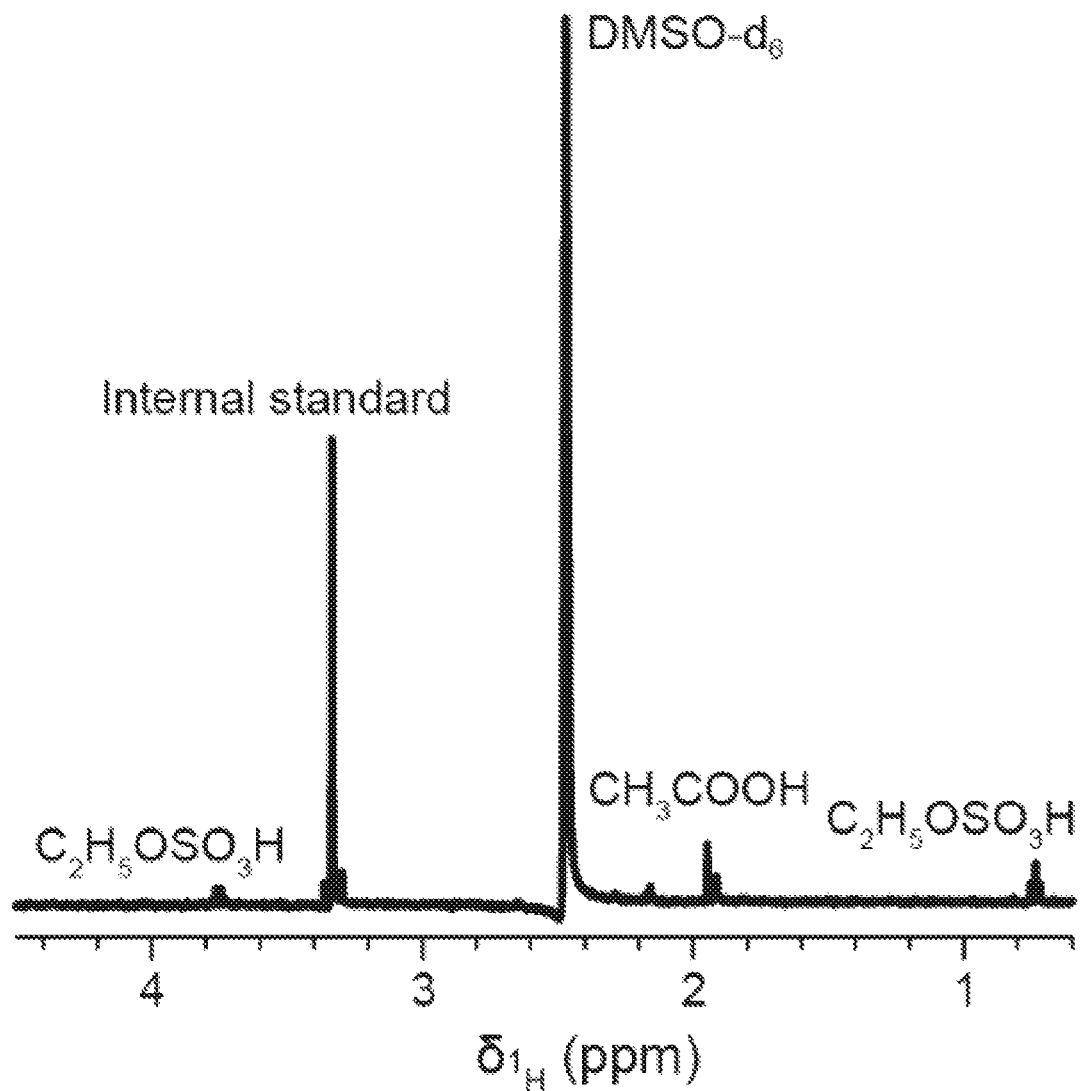
FIG. 11 shows $^1H$ NMR spectrum of liquid aliquots after bulk electrolysis under about 1-bar $C_2H_6$. About 0.7 mM 1, E=about 2.255 V vs. $Hg_2SO_4/Hg$. Here methyl bisulfate ($CH_3OSO_3H$) was used as internal standard to quantify the acetic acid ($CH_3COOH$) as a $C_2$ product.
Figure 12:
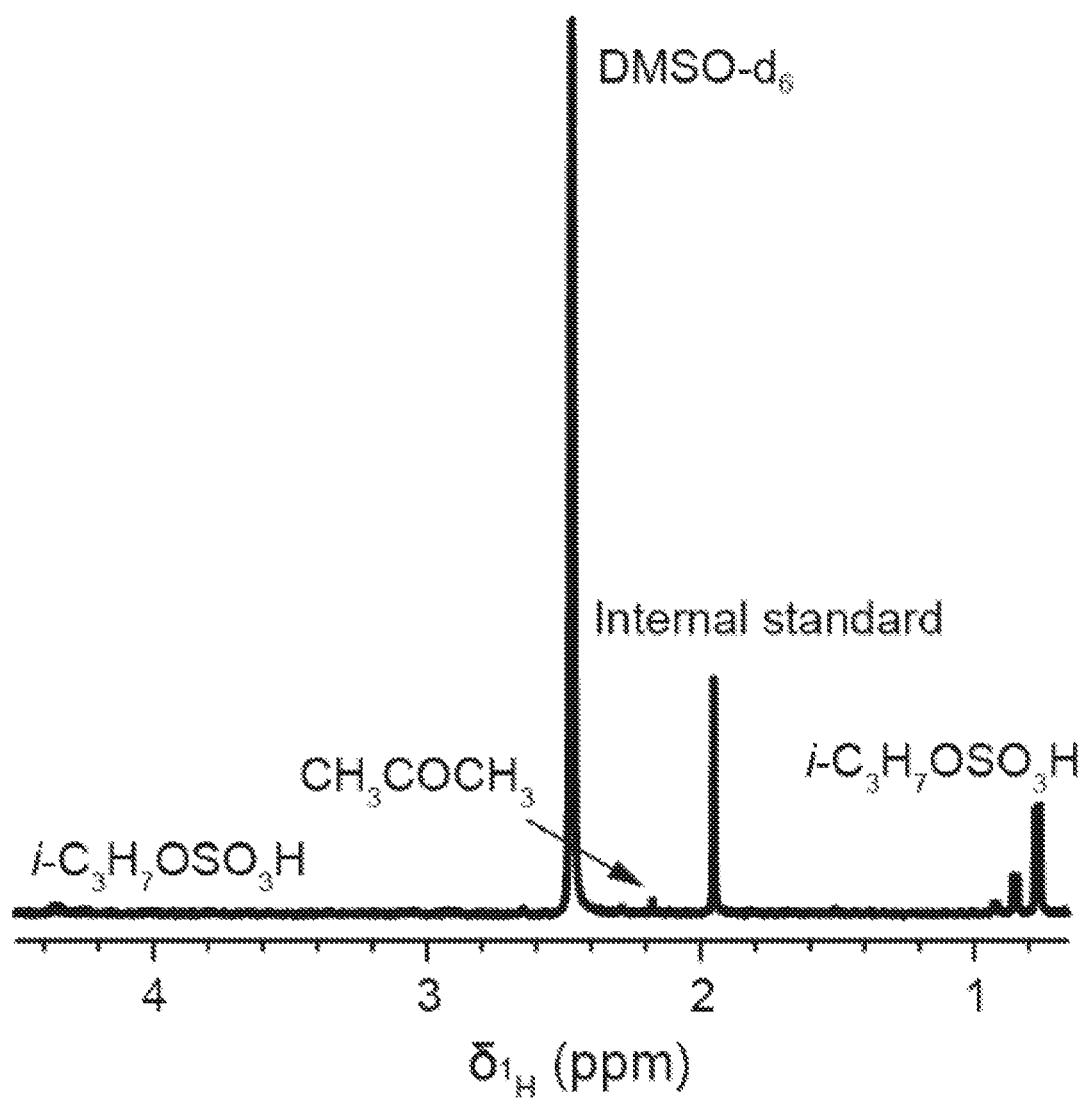
FIG. 12 shows $^1H$ NMR spectrum of liquid aliquots after bulk electrolysis under about 1-bar $C_3H_8$. About 0.7 mM 1, E=about 2.255 V vs. $Hg_2SO_4/Hg$. Here acetic acid ($CH_3COOH$) was used as internal standard.

Expansion is made of the substrate scope from $CH_4$ to ethane ($C_2H_6$), propane ($C_3H_8$), and ultimately natural gas mixture at about 1-bar pressure. $C_2H_6$ was oxidized to a mixture of acetic acid ($CH_3COOH$) and ethyl bisulfate ($C_2H_5OSO_3H$) (FIG. 11), whose TOF values are about 297 and about 235 $hr^{-1}$, respectively. $C_3H_8$ was converted to almost exclusively isopropyl bisulfate (i-$C_3H_7OSO_3H$) with trace amount of acetone ($CH_3COCH_3$) (FIG. 12), with TOF values of about 962 and about 2 $hr^{-1}$, respectively. One challenge in designing a process of natural gas utilization is to balance the low reactivity of the major component $CH_4$ with the high reactivity of minor light alkane components, as in some cases the latter substrates can react about 100-time faster than $CH_4$. The similar TOF values among $CH_4$, $C_2H_6$ and $C_3H_8$ reported here renders 1 a suitable candidate of direct natural gas utilization at ambient conditions without much upstream separation.

Figure 13:
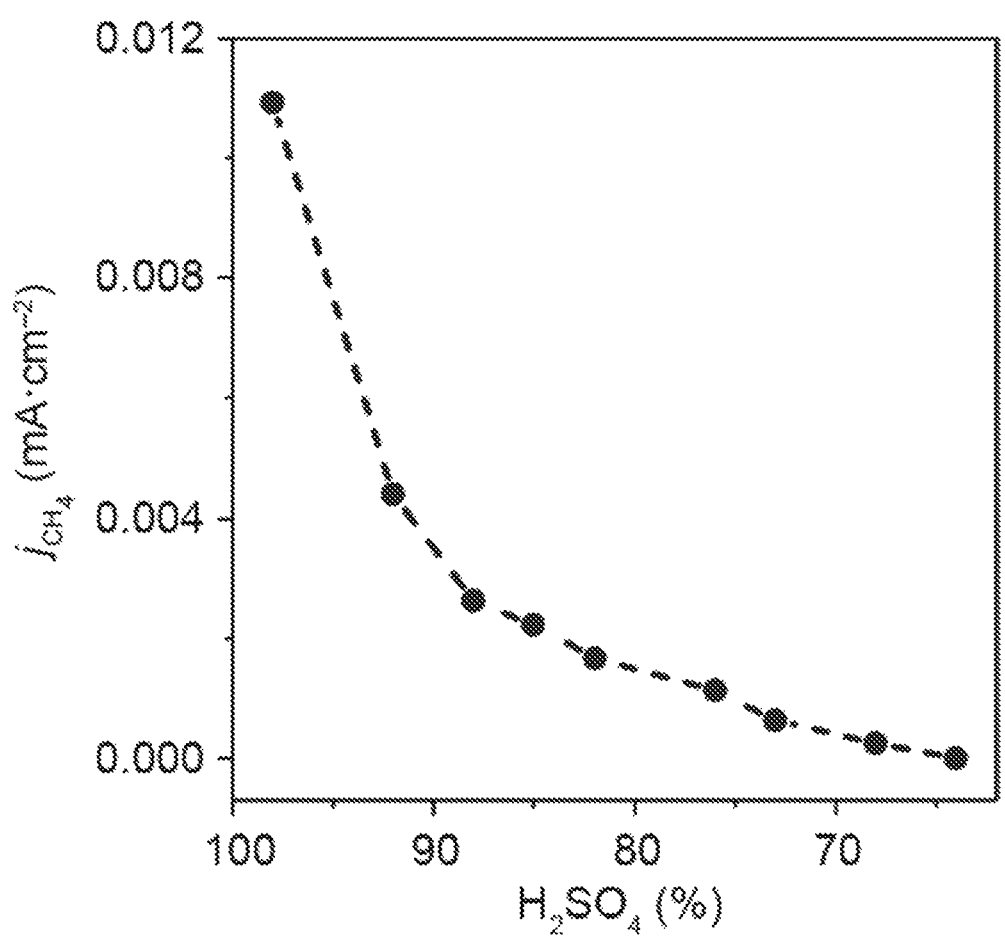
FIG. 13 shows current density corresponding $CH_3OSO_3H$ formation ($j_{CH4}$) versus $H_2SO_4$ concentration. About 25° C., about 0.7 mM 1, about 1-bar $CH_4$, E=about 2.2 V vs. $Hg_2SO_4/Hg$.
Figure 14:
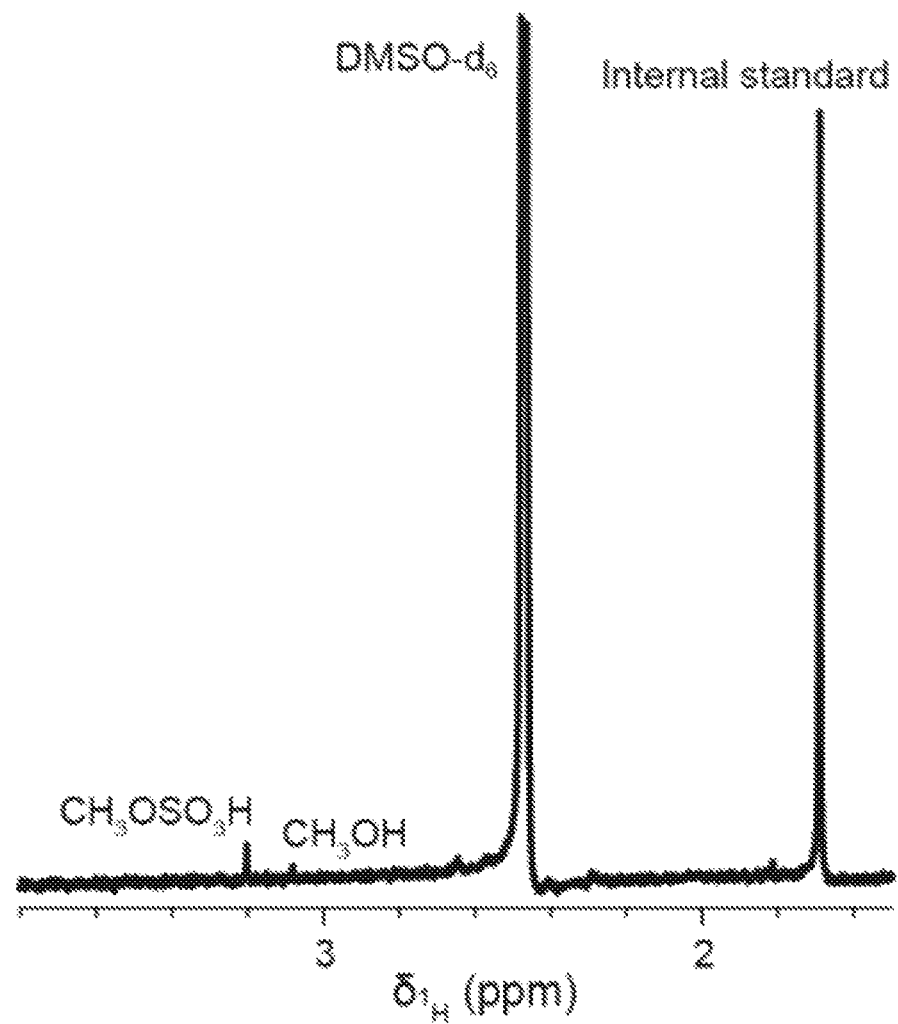
FIG. 14 shows $^1H$ NMR spectrum of liquid samples after bulk electrolysis in about 85% $H_2SO_4$. About 25° C., about 0.7 mM 1, about 1-bar $CH_4$, E=about 2.2 V vs. $Hg_2SO_4/Hg$. A mixture of $CH_3OSO_3H$ and $CH_3OH$ were detected as the product of $CH_4$ functionalization.

Natural gas supplied for testing via pipeline by SoCalGas was used as the substrate of electrolysis (E=about 2.255 V vs. $Hg_2SO_4$/Hg) with about 0.7 mM 1 in about 98% $H_2SO_4$ at room temperature and ambient pressure. Powered by electricity, natural gas was oxidized into organic chemicals while air was reduced on the counter electrode, fulfilling a partial oxidation of natural gas with air. The yielded products mainly composed of $CH_3OSO_3H$ from $CH_4$, $CH_3COOH$ and $C_2H_5OSO_3H$ from $C_2H_6$, and $CH_3COCH_3$ from $C_3H_8$ in the natural gas. The TONs of $C_1$, $C_2$, $C_3$ products reached about 107,000, about 9,300, and about 200 within about 240 hrs, respectively (FIG. 2F). The F. E. of all liquid products remain stable at about 90% during electrolysis after an initial induction period (FIG. 2F, Table 2). The linear relationship between TONs and electrolysis durations indicates that 1 remains active and is tolerant to the impurities in natural gas mixture. Previous analysis indicates that a lower $H_2SO_4$ concentration in the electrolyte, for example below about 80%, is specified for industrial implementation. This criterion is against the thermodynamic limit of reactions in $H_2SO_4$ with $SO_3$ as the oxidant. Yet it is found that 1 remains active towards $CH_4$ functionalization in aqueous solution with $H_2SO_4$ concentrations as low as about 68% under about 25° C. and about 1-bar $CH_4$ (FIG. 13), yielding a mixture of methanol and $CH_3OSO_3H$ (FIG. 14). The robustness under prolonged operation and the applicability in diluted $H_2SO_4$—$H_2O$ mixed solvent renders the catalyst suitable to be employed to functionalize natural gas with minimal maintenance.

Figure 3:
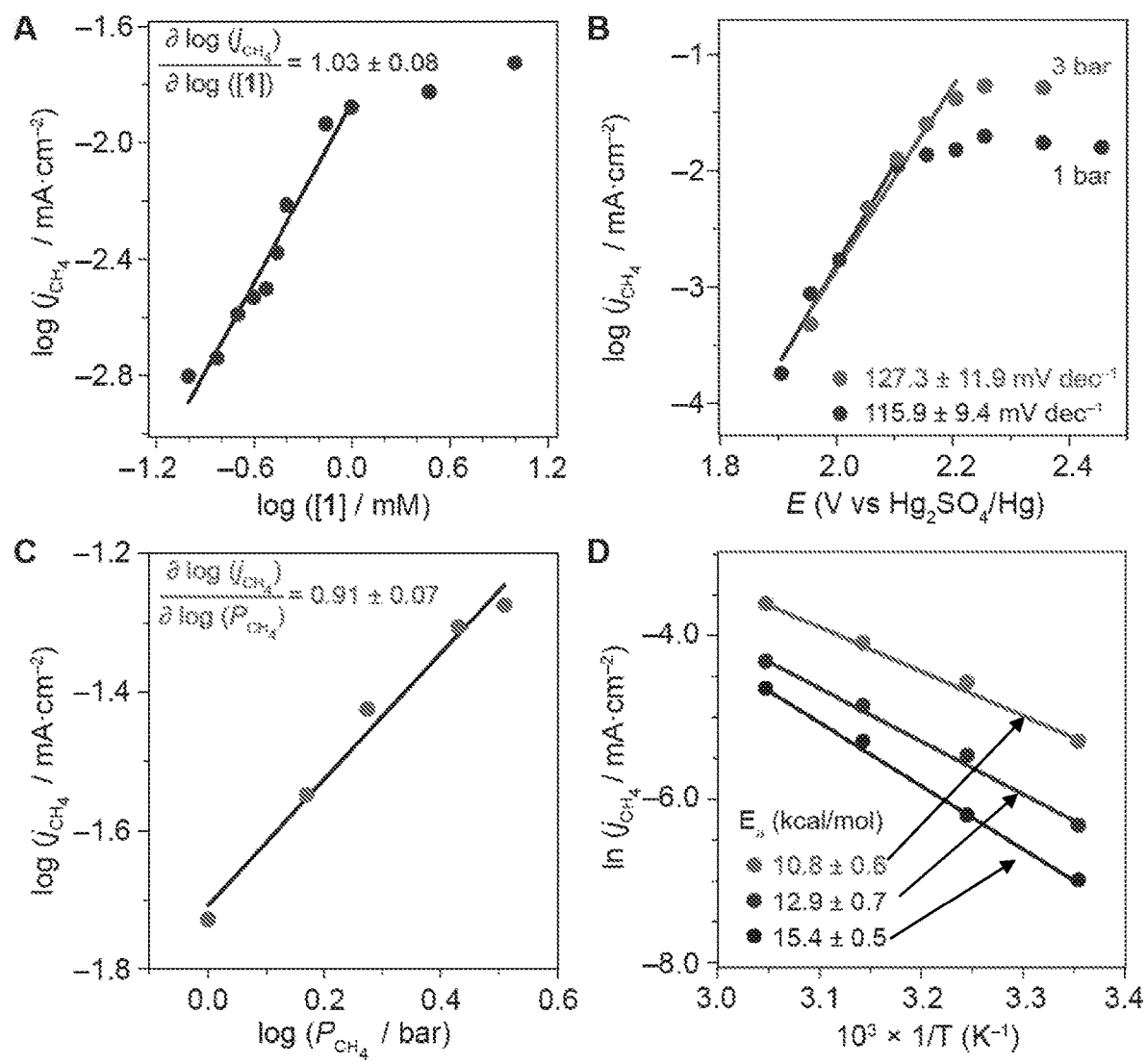
FIG. 3 shows an investigation of electrocatalytic kinetics.
Figure 15:
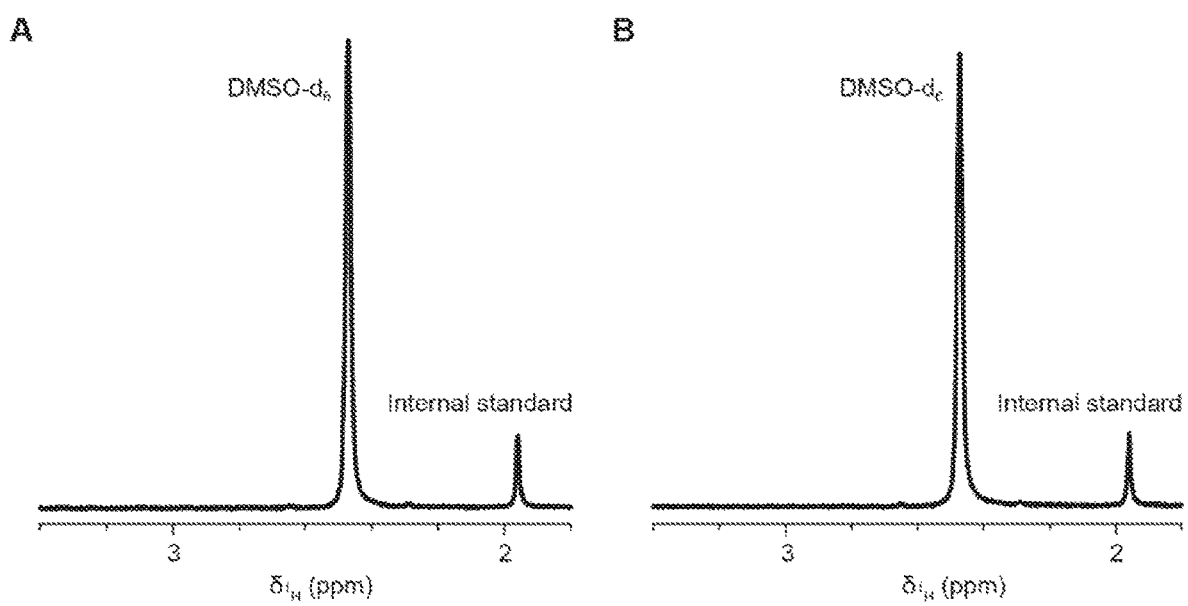
FIG. 15 shows $^1H$ NMR spectra of liquid samples after about 6-hr bubbling of $CH_4$ at about 25° C. to a mixture of about 10 mM 1 and about 10 mM $K_2S_2O_8$ (A), and to a mixture of about 10 mM 1 and about 10 mM $H_2O_2$ (B). Acetic acid ($CH_3COOH$) was used as internal standard. The signals of possible product methyl bisulfate ($CH_3OSO_3H$) were below the detection limit.
Figure 16:
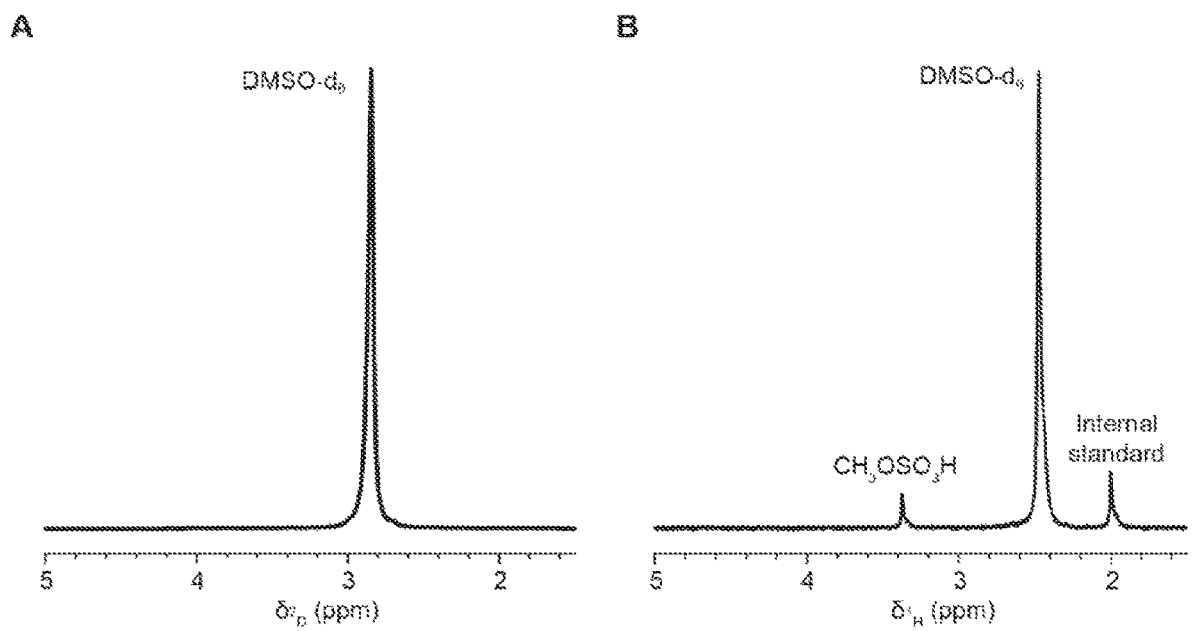
FIG. 16 shows $^2D$ NMR (A) and $^1H$ NMR (B) spectra of liquid aliquots after about 6-hr electrolysis in about 98% $D_2SO_4$. About 25° C., about 10 mM 1, about 1-bar $CH_4$, E=about 2.255 V vs. $Hg_2SO_4/Hg$. Acetic acid ($CH_3COOH$) was used as internal standard for the experiment of $^1H$ NMR. The extent of H/D exchange in the reaction, if any, is below the detection limit of both measurements.

Given the attractive feature of catalyst 1, investigation is made of the underlying mechanism during electrolysis with $CH_4$ as the substrate. The current density corresponding $CH_3OSO_3H$ formation ($j_{CH4}$), a surrogate of $CH_4$-activating rate, was investigated as a function of catalyst concentration [1] (FIG. 3A), the electrode potential E (FIG. 3B), the partial pressure of $CH_4$ (paw) (FIG. 3C), and the temperature T (FIG. 3D). A linear relationship with a slope=1.03±0.08 between $\log_{10}(j_{CH4})$ and $\log_{10}([1])$ indicates that $CH_4$ activation is first-order on 1 (FIG. 3A). When $\log_{10}(j_{CH4})$ was plotted against E (FIG. 3B), a Tafel slope of about 120 mV/dec was observed before jaw plateaus at large E values as $CH_4$ is depleted near electrode. This indicates that the first electron removal from 1 is the turnover-limiting step (TLS). The overlapping points under about 1-bar and about 3-bar $CH_4$ pressure when E<about 2.1 V vs. $Hg_2SO_4$/Hg indicate that $CH_4$ is not in the TLS or any pre-equilibrium steps. When E>about 2.1 V vs. $Hg_2SO_4$/Hg, a linear relationship between $\log_{10}(j_{CH4})$ and $\log_{10}(p_{CH4})$ with a slope of 0.91±0.07 (FIG. 3C) indicates that $CH_4$ is first-order activated after the TLS. The Arrhenius plot between $\ln(j_{CH4})$ and $1/T$ yields an apparent activation energy (Ea) as low as 10.8±0.6 kcal/mol (FIG. 3D), consistent with the observed reactivity at ambient temperature. When $CH_4$ was exposed to 1 in about 98% $H_2SO_4$ with added $K_2S_2O_8$ or $H_2O_2$ in the absence of electricity, $CH_4$ activation was not observed at ambient conditions (FIG. 15). This indicates that the observed reactivity of 1 does not involve free reactive oxygen radicals. Electrolysis of 1 is conducted in about 98% $D_2SO_4$ with $CH_4$ of natural isotope abundance. $^2$D and $^1$H NMR spectra showed no H/D exchange in the methyl group of product $CH_3OSO_3H$ (FIG. 16). This excludes the possible mechanism induced by an electrochemically generated superacid, which should yield significant H/D exchange in the methyl group. Overall, the experimental data support an electrochemical catalysis of low activation energy. After a turnover-limiting one-electron oxidation of 1, the oxidized species undergoes a first-order C—H activation in $CH_4$ (FIG. 1E).

Figure 4:
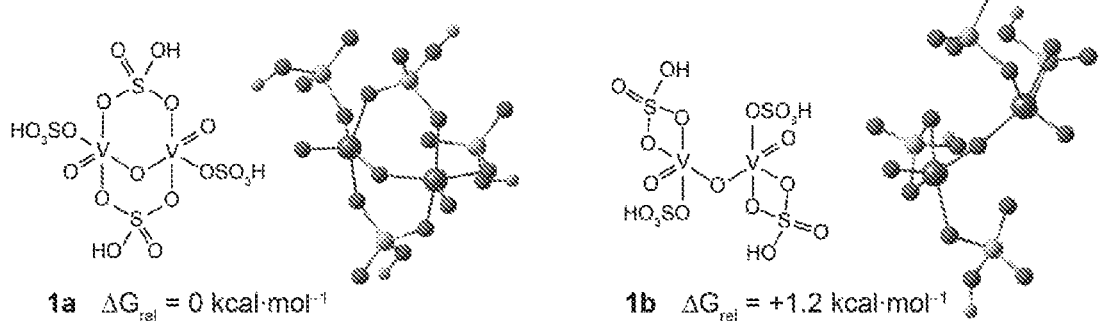
FIG. 4 shows structural information of catalyst and a proposed catalytic cycle.
Figure 4:
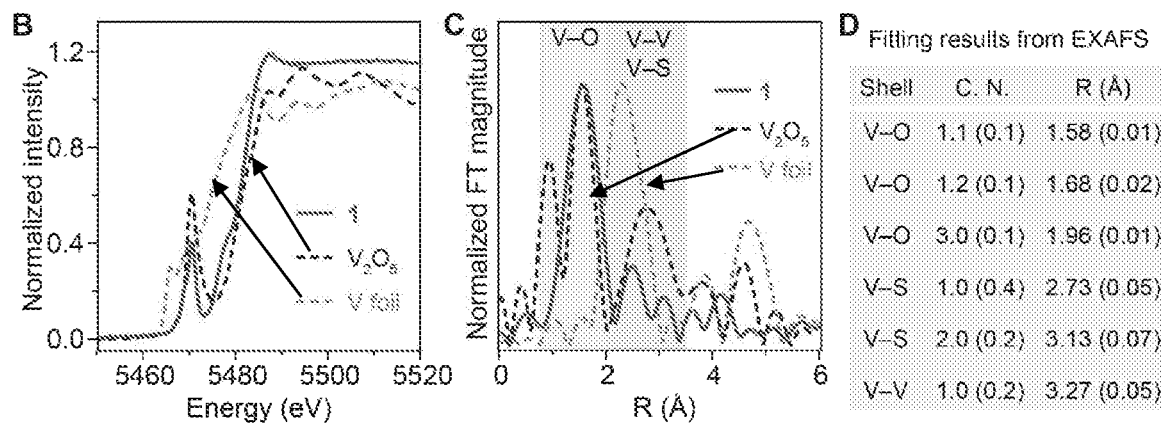
Figure 4:
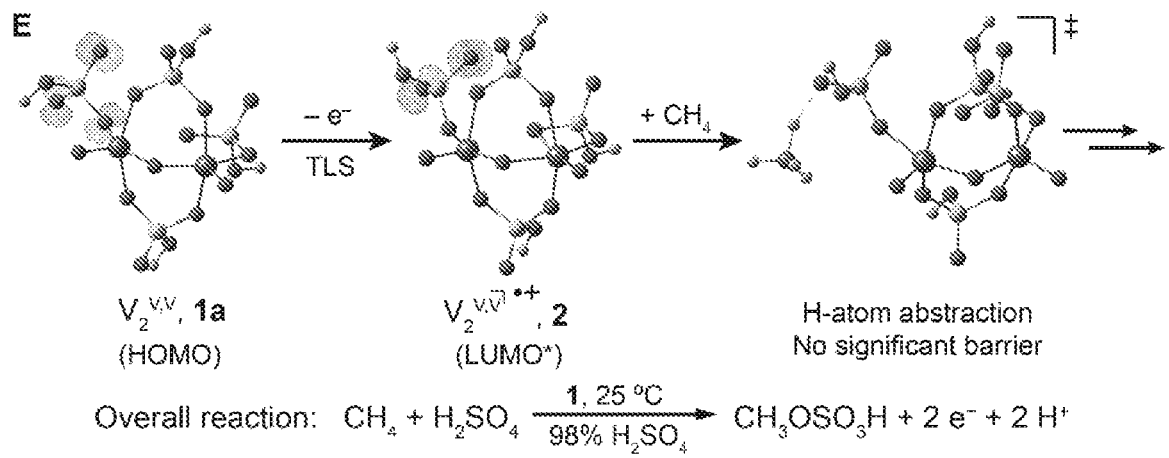
Figure 19:
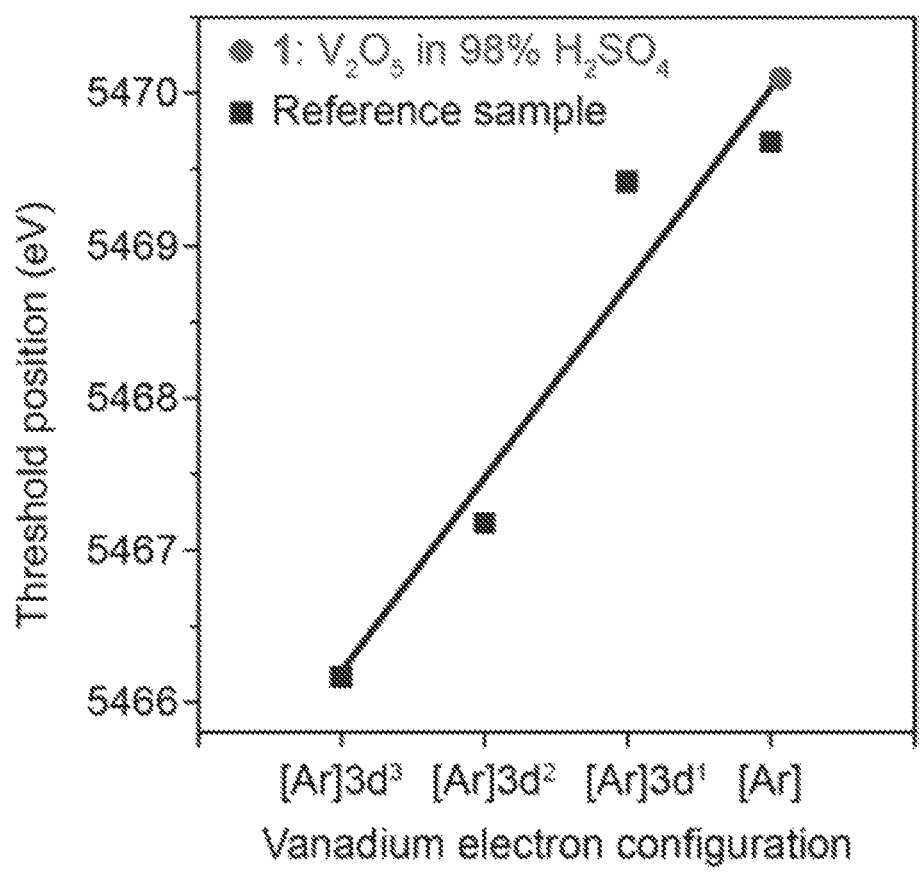
FIG. 19 shows threshold position versus vanadium electron configuration in V K-edge XANES spectra of VO, $V_2O_3$, $VO_2$, $V_2O_5$ and about 10 mM 1 in about 98% $H_2SO_4$.
Figure 20:
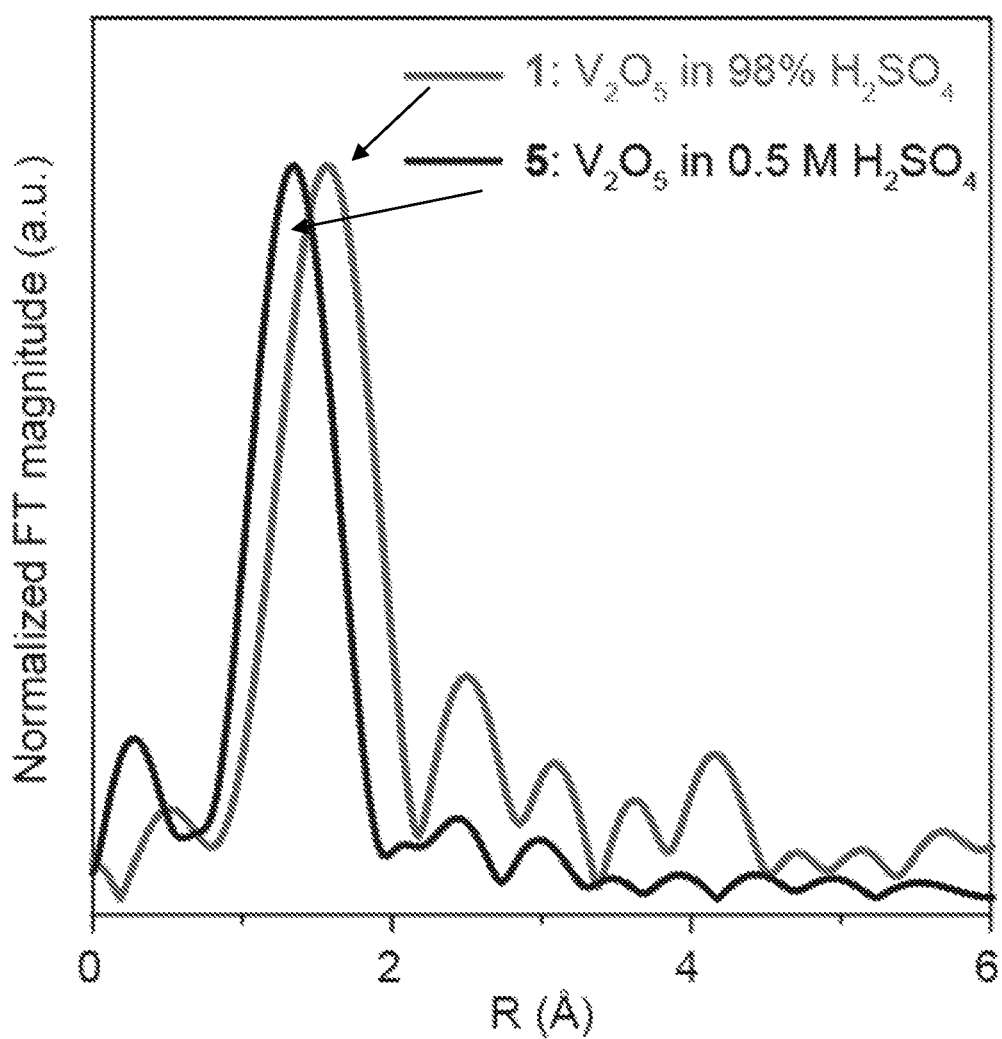
FIG. 20 shows extended X-ray absorption fine structure (EXAFS) of catalyst of about 10 mM 1 in about 98% $H_2SO_4$ as well as about 10 mM monometallic $VO_2^+$ species (5) prepared by dissolving $V_2O_5$ in about 0.5 M $H_2SO_4$.
Figure 21:
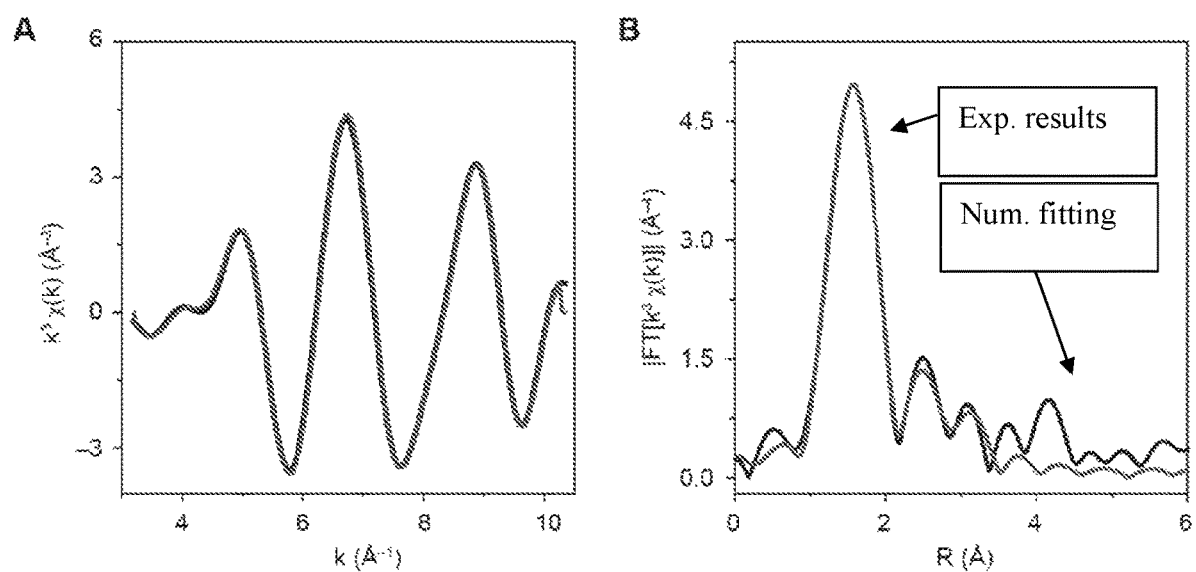
FIG. 21 shows the EXAFS k-space (FIG. 21A) and R-space (FIG. 21B) curves for the experimental results of catalyst 1 (black) as well as the corresponding numerical fitting (red). The parameters that lead to such a fitted curve are displayed in FIG. 4D.

Despite its ease of preparation, the structural information of 1 is largely to be determined. It is hypothesized to be a $V_2^{V,V}$ dimer with two terminal $V^V$=O moieties connected by a bridging —O—. Measurement is made of 1's optical absorption (FIG. 17) and the $^{51}$V NMR spectrum (FIG. 18), which confirmed that 1 is different from monometallic $VO_2^+$ species in an aqueous medium. DFT calculations indicate that 1 may exist as two isomers, 1a and 1b (FIG. 4A), with a calculated energy difference of about 1.2 kcal/mol. As crystallization of 1 is not attained without significant structural changes, X-ray absorption spectroscopy of V atom was conducted for about 10 mM 1 in about 98% $H_2SO_4$, solid $V_2O_5$, and metallic V foil (solid red, dashed blue, and dashed yellow in FIGS. 4B and 4C, respectively), in an attempt to obtain structural information of 1 in solution. A least-square-regression analysis is carried out on X-ray absorption near-edge structure (XANES) for the threshold positions, the first peak in the derivative spectra, of VO, $V_2O_3$, $VO_2$, and $V_2O_5$ to determine the electronic structure and oxidation state of vanadium in 1 (FIG. 19). The electronic structure of vanadium in 1 remains similar to that of vanadium in $V_2O_5$, confirming the $d^0$ electronic structure of vanadium. The extended X-ray absorption fine structure (EXAFS) can provide coordination information of absorbing atoms by extracting the structural parameters. As shown in FIG. 4C, the absence of noticeable peaks in the region beyond about 4 Å (solid red), compared with those of $V_2O_5$ and V foil (dashed blue and dashed yellow, respectively), indicates that 1 is a complex homogenously dispersed in the solvent. The peak at about 1.56 Å in 1's EXAFS spectrum (grey area) is attributed to the V—O bonds, following the assignment of V—O bonds in the $V_2O_5$ sample. While this comparison provides some information, the general low symmetries of the vanadium-based species impede from gaining detailed structural information of 1 solely based on EXAFS data. To this end, the fitting of 1's V K-edge EXAFS spectrum is conducted by combining the preliminary structure indicated by DFT calculations (shown in FIG. 4D). It reveals that the central V atoms are penta-coordinated by O atoms with three types of V—O bond lengths (about 1.58, about 1.68, and about 1.96 Å) in the first coordinated shell, with a bridging oxo with a V—O bond length of about 1.68 Å. The EXAFS of 1 indicates an unusual coordination environment about 2.0 to about 3.5 Å away from V atom (blue area), which is different from the monometallic $VO_2^+$ species in aqueous medium (FIG. 20). The fitting results of second shell (blue area) indicate that consistent with the predicted structure 1a, there are not only three S atoms in the second shell (2.73 and 3.13 Å) but also one V atom at the distance of 3.27 Å away from the central V atom (Table 3). Detailed analysis is provided in the supplementary information (FIG. 21). These results reveal the existence of a hypothesized structure of μ-oxo bridged $V_2^{V,V}$ dimer, and indicate that 1a is the structure of 1 in the solution.

Figure 22:
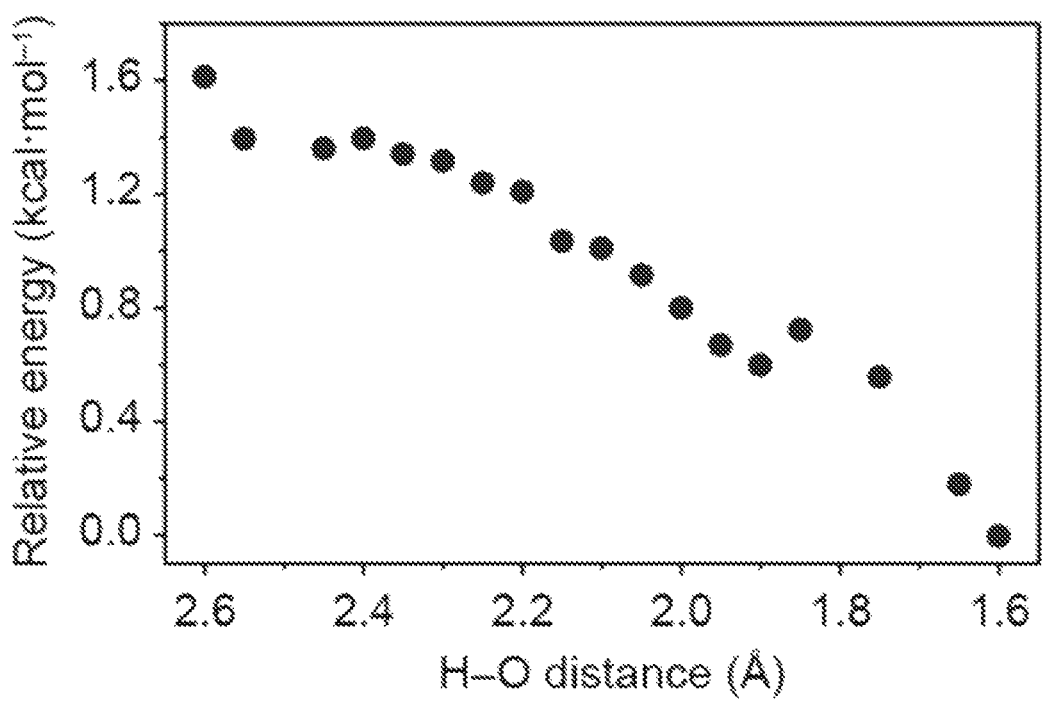
FIG. 22 shows potential energy surface for the $CH_4$-cation radical 2 system along the H—O bond distance.

Combining experimental and computational results, a proposed catalytic cycle of 1a for $CH_4$ functionalization is established (FIG. 1E). A turnover-limiting electrochemical oxidation of 1a removes one electron from O 2p orbitals in the sulfonic ligand, which is calculated as the highest occupied molecular orbital (HOMO) of 1a (FIG. 4E). The resultant cation radical 2 is predicted to possess an empty frontier spin-orbital on the same O 2p orbitals (lowest unoccupied molecular orbital (LUMO) of 2 in FIG. 4E), which is postulated to initiate H-atom abstraction from $CH_4$. DFT calculations predict reaction trajectory between 2 and $CH_4$ without significant energy barrier (FIGS. 4E and 22) This is consistent with the experimental observation that the TLS is the one-electron oxidation of 1 other than the step of C—H activation. Such a low barrier of C—H activation also helps explain the similar TOFs towards various light alkanes in the natural gas. As characterization of 2 spectroelectrochemically is not attained due to its transient nature, the subsequently steps of $CH_4$ functionalization can be subjected to further investigation. Yet it is proposed that a two-electron oxidation of $CH_4$ yields $CH_3OSO_3H$ along with the formation of $V_2^{IV,V}$ dimer (3), which will be readily re-oxidized electrochemically to regenerate 1 (FIG. 1E).

Figure 23:
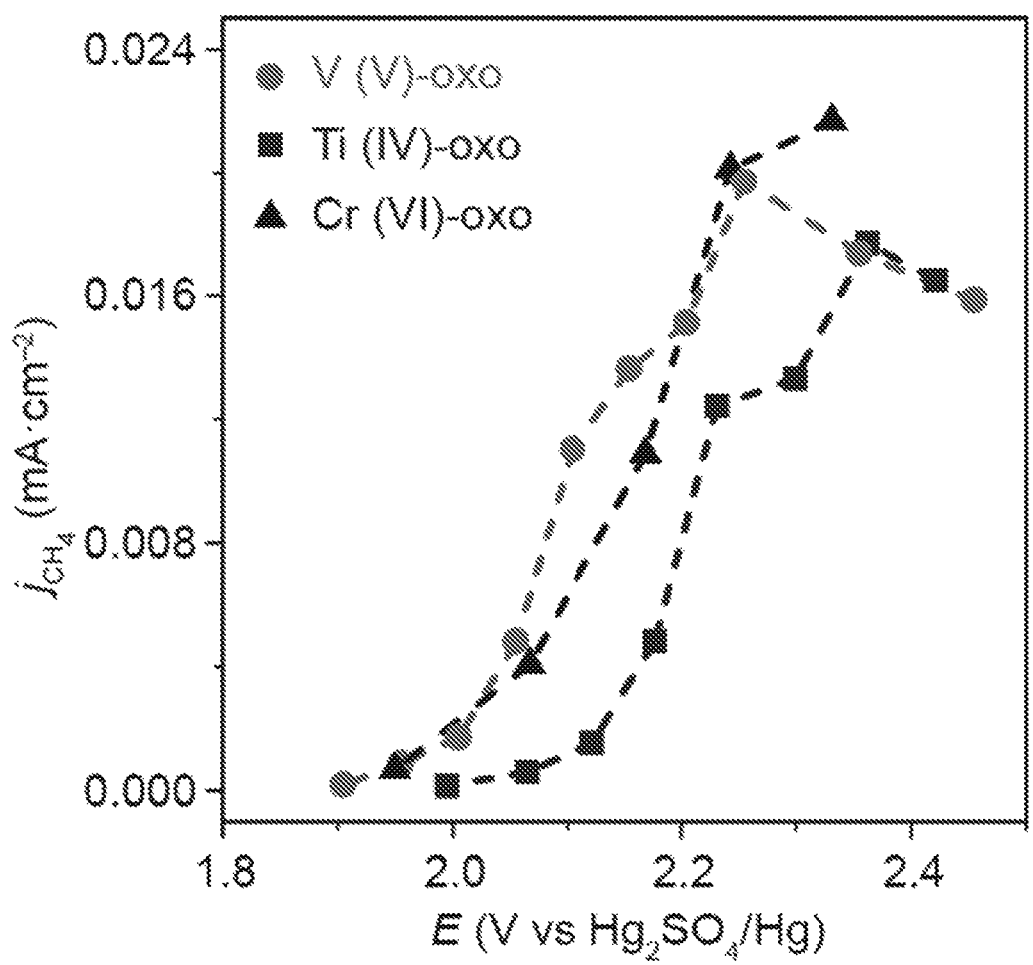
FIG. 23 shows current density corresponding $CH_3OSO_3H$ formation ($j_{CH4}$) versus electrode potential E with 10 mM vanadium (V)-oxo (1), titanium (IV)-oxo, and chromium (VI)-oxo species, respectively. About 25° C., about 1-bar $CH_4$.
Figure 24:
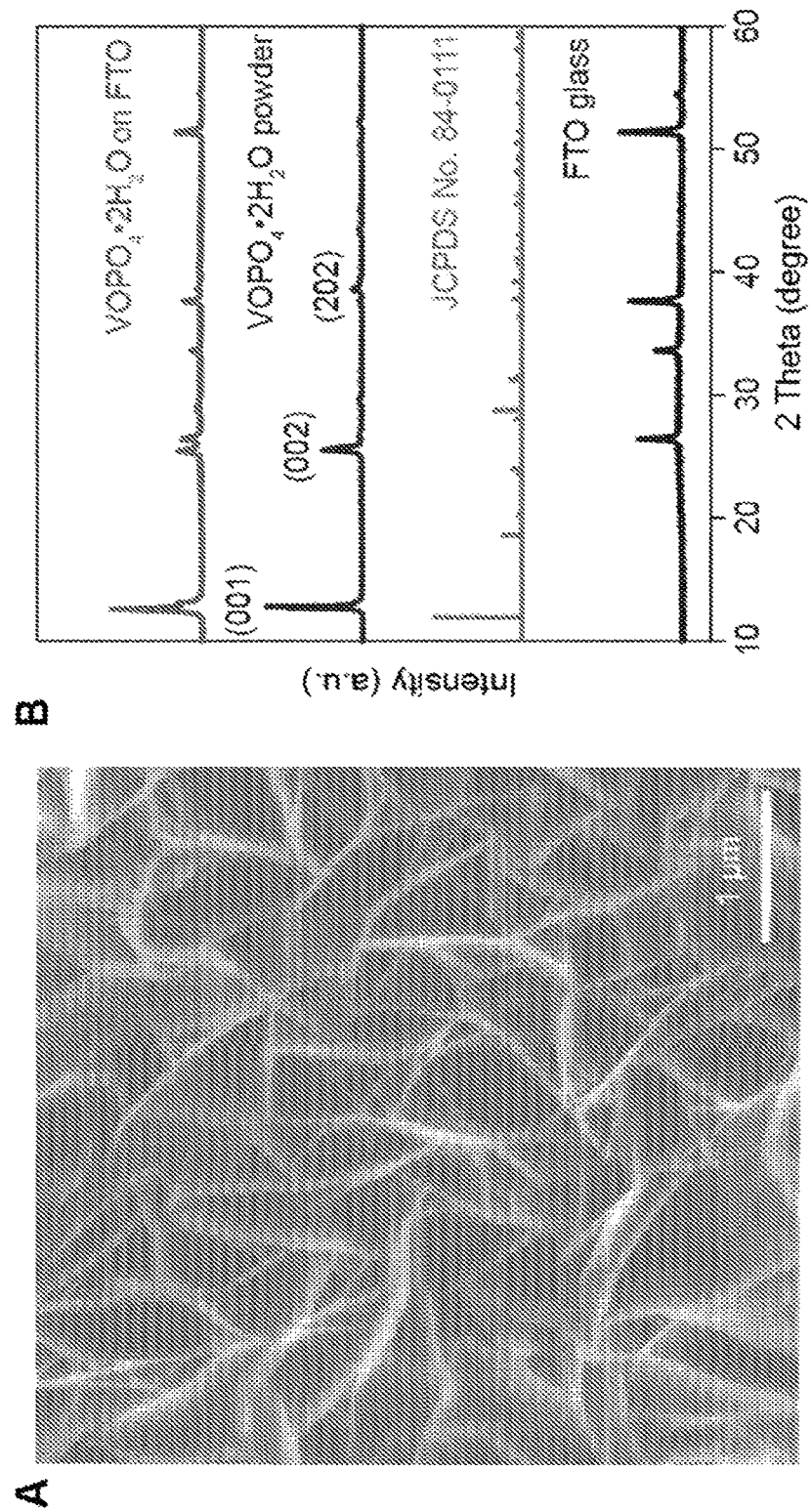
FIG. 24A shows image of scanning electron microscopy of $VOPO_4.2H_2O$ (4), the heterogeneous variant of the catalyst.
FIG. 24B shows powder X-ray diffraction patterns of as-prepared 4 (blue), 4 loaded on FTO electrode (red), the pattern of $VOPO_4 \cdot 2H_2O$ (green, JCPDS No. 84-0111), and the blank FTO electrode as a reference (black).
Figure 25:
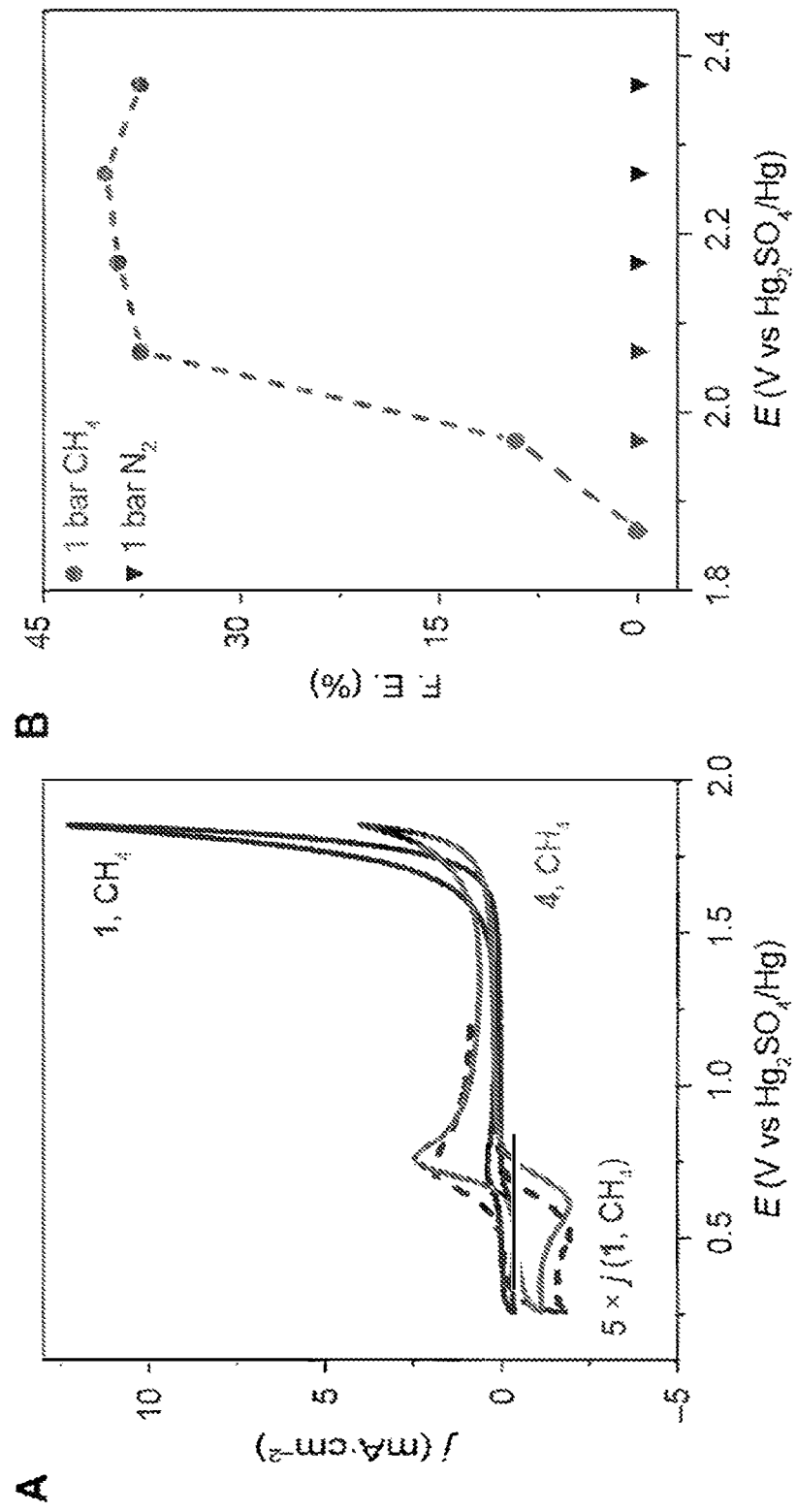
FIG. 25A shows cyclic voltammograms of homogeneous catalyst of about 10 mM 1 (blue) and heterogeneous catalyst 4 with a loading amount of about 1.9 mg/cm$^2$ (red). About 25° C., about 98% $H_2SO_4$, about 100 mV·s$^{-1}$, about 1-bar $CH_4$, about 2-mm Pt working electrode. The current density of 1 is magnified by a factor of about 5 (blue dashed line).
FIG. 25B shows faradaic efficiency (F. E.) of catalyst 4 as a function of electrode potential E in about 1-bar $CH_4$ (red) and about 1-bar $N_2$ (blue). About 25° C., about 98% $H_2SO_4$, with data recorded from about 6-hr bulk electrolysis.

One intriguing feature of the proposed mechanism is that the metal-oxo center might merely serve as a carrier of sulfonic ligands, which can be electrochemically oxidized into a cation radical at ambient conditions for $CH_4$ activation. Had such a speculation be true, other metal-oxo species can possess similar reactivities. It is found that $d^0$ metal-oxo species, including $Ti^{IV}$-oxo and $Cr^{VI}$-oxo, are also electrochemically active towards functionalizing $CH_4$ at ambient conditions (FIG. 23). It indicates that the strategy of employing early transition-metal oxo species could be generally applicable for ambient electrochemical functionalization of $CH_4$. Practically, a heterogeneous catalyst variant may be desirable. It is found that a two-dimensional layered material, $VOPO_4 \cdot 2H_2O$ (4), with exposed V-oxo edges (FIG. 24), acts as a heterogeneous variant of 1 in about 98% $H_2SO_4$ (FIG. 25). This preliminary result indicates that even within the same metal-oxo system the catalyst and subsequently its reactivity can be tuned with additional materials design and engineering. Overall, the general tunability of catalyst composition may herald better catalysts with higher TOF, lower oxidation potential, as well as versatile design of the overall process. Additional fundamental and engineering investigation can further explore the possible application of converting $CH_4$ into commodity chemicals with minimal infrastructure support at remote locations, which will lead to the more efficient usage of green-house gases and reducing their emission into atmosphere.

Supplementary Materials:
Materials and Methods

Chemicals and materials. All chemicals were purchased from Sigma-Aldrich, Thermo Fisher Chemical, or VWR International, unless otherwise stated. All chemicals were used as received unless specified. Dimethyl sulfoxide-$d_6$ (DMSO-$d_6$) was purchased from Cambridge Isotope Laboratories, Inc. All deionized (DI) water was obtained from a Millipore Milli-Q Water Purification System. Fluorine-doped Tin Oxide (FTO) glass was purchased from Hartford Glass Incorporation. $CH_4$ (about 99.5%) was purchased from Airgas, $C_2H_6$ (about 99%), $C_3H_8$ (about 98%), and $^{13}CH_4$ (about 99%; about 99 atom % 13C) were purchased from the Sigma-Aldrich. Natural gas mixture was obtained from the outlet in Molecular Science Building 4211, Department of Chemistry and Biochemistry, UCLA, which is supplied via pipeline by SoCalGas. SRI multiple gas analyzer #5 gas chromatograph (GC), 8610C is used to analyze the natural gas mixture. The components are about 91.78 mole % $CH_4$, about 4.31 mole % $C_2H_6$, about 0.31 mole % $C_3H_8$, about 0.04 mole % n-$C_4H_{10}$, about 0.03 mole % i-$C_4H_{10}$, about 0.01 mole % n-$C_5H_{12}$, about 0.01 mole % i-$C_5H_{12}$, and about 0.81 mole % $CO_2$.

Chemical and material characterizations. Ultraviolet-visible (UV-Vis) spectra was conducted on Hewlett-Packard 8453 UV-Vis spectrophotometer. Proton nuclear magnetic resonance ($^1$H-NMR) and carbon nuclear magnetic resonance ($^{13}$C-NMR) were recorded on a Bruker AV400 (400 MHz) spectrometer. Deuterium nuclear magnetic resonance ($^2$D-NMR) was recorded on a Bruker AV500 (500 MHz) spectrometer. Vanadium nuclear magnetic resonance ($^{51}$V-NMR) was performed on an Agilent DD2 600 (600 MHz) spectrometer. Powder X-ray diffraction (XRD) patterns were measured on a Panalytical X'Pert Pro X-ray Powder Diffractometer with a Cu Kα source (λ=about 1.54178 Å), The intensities were recorded within the 2θ range from about 10° to about 60° with a voltage of about 45 kV, and a current of about 40 mA. Scanning electron microscope (SEM) image was measured with a JEOL JSM 6700 F instrument. X-ray Absorption Near Edge Structure (XANES) and Extended X-ray Absorption Fine Structure (EXAFS) were recorded at BL17C of National Synchrotron Radiation Research Center (NSRRC), Hsinchu, Taiwan. Gas chromatography-mass spectrometry (GC-MS) was performed on Agilent 6890-5975 GC-MS with Inert XL Selective Detector. The GC is equipped with a capillary HP-5MS column (Model No.: 19091S-433, about 30.0 m×250 μm×0.25 μm). The instrument is operated with an oven temperature of about 50° C., an inlet temperature of about 280° C., and a flow rate of about 1.2 mL/min with helium carrier gas. A split/splitless injector is applied with a split ratio of about 5:1 and a split flow of about 5 mL/min. The MS has a source temperature of about 230° C. and a quadrupole temperature of about 150° C. The SRI multiple gas analyzer #5 gas chromatograph (GC) is equipped with 3 S.S. columns including 18" Hayesep D, 3'MS 5A and 6' Hayesep D. The instrument is operated with an oven temperature of about 50° C., a temperature profile from about 50° C. to about 270° C., and a flow rate of about 40 mL/min at about 15 psi with argon carrier gas.

Catalyst preparation. Homogeneous bimetallic catalyst 1 was prepared by dissolved vanadium pentoxide ($V_2O_5$) in about 98% $H_2SO_4$. Homogeneous titanium (IV)-oxo and chromium (VI)-oxo catalysts were prepared by dissolved titanyl sulfate ($TiOSO_4$) and potassium chromate ($K_2CrO_4$) in about 98% $H_2SO_4$, respectively. The heterogeneous variant 4 ($VOPO_4 \cdot 2H_2O$) was prepared based on reported procedure. $V_2O_5$ (about 4.8 g), $H_3PO_4$ (about 85.5%, about 26.6 mL), and $H_2O$ (about 115.4 mL) were refluxed at about 110° C. for about 16 hrs. After gently cooling down to room temperature, the yellow precipitate in the mixture was collected by filtration and washed several times with water and acetone. The resulting sample was dried in an oven at about 100° C. for about 3 hrs. When 4 was investigated for its electrochemical response, 4 was loaded onto a FTO electrode via a dip-coating procedure. A dispersion of 4 was prepared at a concentration of about 6 mg/mL in 2-propanol. The yellow dispersion was ultrasonicated for about 30 min until the color of the dispersion became faded. Afterwards, sodium carboxymethyl cellulose (CMC) was added into the dispersion (weight ratio of $VOPO_4 \cdot 2H_2O$:CMC=about 80:5). The mixture was stirred at about 600 revolution per minute (rpm) on the heating plate to remove excess 2-propanol and form a homogenous slurry, which was then dip-coated onto FTO at a loading amount of about 1.9 mg/cm$^2$ for 4.

Electrochemical characterization. All electrochemical experiments were recorded using a Gamry Instruments Reference 600+ and Interface 1000 potentiostats. Unless mentioned specifically, a three-electrode setup was applied with a Pt wire pseudo-reference electrode and a Pt counter electrode. The Pt pseudo-reference electrode was calibrated to a $Hg_2SO_4$/Hg (saturated $K_2SO_4$) reference electrode (CH Instrument, Inc.) via the measurement of open-circuit potentials. The relationship is: E(V vs. $Hg_2SO_4$/Hg)=E(V vs. Pt)+0.755 V. The gas environment of the electrochemical cell was controlled either $CH_4$ (Airgas, about 99.5%) or $N_2$ (Airgas, about 99.999%), which were bubbled into the reactor at rates of about 7.2 ($CH_4$) and about 10 ($N_2$) standard cubic centimeters per minute (sccm) with the use of a mass flow controllers (Omega Engineering, Inc., FMA5510A). The data were reported after iR compensation. Unless noted specifically, the electrolyte is about 98% $H_2SO_4$ with a certain vanadium concentration of 1.

Experiments of cyclic voltammetry were conducted in a single-chamber electrochemical cell with a 2-mm Pt working electrode (CH Instruments, Inc.). Bulk electrolysis was typically conducted in a two-chamber electrochemical cell with a Nafion 117 membrane as the separator and a piece of commercial fluorine-doped tin-oxide (FTO) glass as the working electrode. Here the FTO glass was encapsulated with Teflon tapes so that the exposed electrode is about 1 cm×1 cm in dimension. The solution was pre-saturated with $CH_4$ or $N_2$ for about 20 mins before the commencement of electrolysis. The background signal contribution of FTO glass was subtracted for the recorded data. Liquid aliquots were taken before, during and after the electrolysis for product analysis. Gaseous samples were taken manually from the outgas of the reactor, diluted with pure $N_2$ (about 1:5 ratio) for transportation purpose, and manually injected into the GC-MS. The injected permanent gas was not well separated by the column, but the MS spectra of the eluted gas peak (t of about 3.3 min) was capable to quantify permanent gases with a detection limit of about 10 ppm. The experiments at elevated pressure were conducted into a custom-designed setup. In this setup, the gas pressure was controlled between about 1 to about 3 bar and a constant gas flow of about 28.7 sccm was maintained during the electrolysis. The temperature of the electrolysis was maintained by an oil bath at a range between about 25° C. and about 55° C. For experiments using substrates other than $CH_4$, the same procedure is followed except the gas flow rate is set at about 10 sccm calibrated against $N_2$. In the about 240-hr electrolysis using natural gas mixture as the substrate, the electrolyte was refilled after each aliquot sampling in order to maintain a constant electrolyte volume.

When the heterogeneous variant 4 was investigated for its electrochemical response, a similar procedure was followed. However, owing to the difference of solution composition, the Pt pseudo-reference electrode has a different relationship with the $Hg_2SO_4$/Hg reference electrode: E(V vs. $Hg_2SO_4$/Hg)=E(V vs. Pt)+0.268 V.

Attempts of using chemical oxidants at ambient conditions. When $CH_4$ (about 7.2 sccm, about 1 bar) was bubbled into an about 98% $H_2SO_4$ solution with about 10 mM 1 and about 10 mM $K_2S_2O_8$ for about 6 hrs at ambient conditions, the formation of methyl bisulfate ($CH_3OSO_3H$) as a possible product of $CH_4$ oxidation was not observed (FIG. 15A). Similar experiment was conducted with about 10 mM $H_2O_2$ in lieu of $K_2S_2O_8$. The formation of methyl bisulfate ($CH_3OSO_3H$) as a possible product of $CH_4$ oxidation was not observed (FIG. 15B), either.

Quantification of liquid products. $^1$H-NMR was applied to quantify product accumulation in DMSO-$d_6$ using acetic acid ($CH_3COOH$) as the internal standard. About 0.4 mL liquid aliquots from electrolysis were mixed with about 0.1 mL DMSO-$d_6$ prior to the measurements. Chemical shifts are reported on a parts-per-million (ppm) scale. Methyl bisulfate ($CH_3OSO_3H$) exhibits a singlet at about 3.34 ppm while the singlet from acetic acid ($CH_3COOH$) peak resides at about 1.96 ppm. A calibration curve was constructed by determining the relative ratio of integrated area between the NMR peaks of $CH_3OSO_3H$ and $CH_3COOH$. Product quantification of $C_2H_6$, $C_3H_8$ and natural gas mixture follows the same protocol, except for the quantification of $CH_3COOH$ as a $C_2$ product from $C_2H_6$. The quantification of $CH_3COOH$ as a $C_2$ product was fulfilled by adding a known concentration of $CH_3OSO_3H$ as an internal standard in a separate $^1$H-NMR measurement.

In the $CH_4$ functionalization, the residual current density, calculated as the difference between total current density ($j_{total}$) and current density yielding $CH_3OSO_3H$ ($j_{CH4}$), is independent of $p_{CH4}$ (FIG. 8). It indicates that no gaseous or liquid products other than $CH_3OSO_3H$ were produced as a product of $CH_4$ oxidation and solvent oxidation is the sole possible side reaction.

Calculation of Faradaic efficiency. The Faradaic efficiency (F. E.) of bulk electrolysis was calculated based on the following equation:

$$F.E. = \frac{nFC_{product}V_{solution}}{\text{Overall charge}} \times 100\%.$$

Here F is the Faraday's constant, $C_{product}$ is the concentration of product after bulk electrolysis, $V_{solution}$ is the total electrolyte volume, and the "Overall Charge" is the total electric charges passed through the working electrode. The variable n in the equation is the number of electrons in order to generate one product molecule by electrochemistry. n=2 for the formation of methyl bisulfate ($CH_3OSO_3H$) from $CH_4$. n=2 and 6 for the formation of ethyl bisulfate ($C_2H_5OSO_3H$) and acetic acid ($CH_3COOH$) from $C_2H_6$, respectively. n=2 and 4 for the formation of isopropyl bisulfate (i-$C_3H_7OSO_3H$) and acetone ($CH_3COCH_3$) from $C_3H_8$, respectively.

Calculation of turnover frequency (TOF) and turnover number (TON). In the following provided are the protocols to calculate the TOFs and TONs for the reported data, based on established methods.

The diffusion coefficient for 1 (D) was determined from the cyclic voltammograms based on the Randles-Sevcik equation:

$$j_p = 0.4463 nFC_{cat}\left(\frac{nFvD}{RT}\right)^{\frac{1}{2}}.$$

Here $j_p$ is the peak current density of quasi-reversible redox couple, n is the number of electrons transferred in the redox event, F is the Faraday's constant, $C_{cat}$ is 1's concentration, v is the scan rate, R is the gas constant, and T is the temperature of experiment. As derived from FIG. 5, D=about $2.18 \times 10^{-7}$ cm$^2 \cdot$s$^{-1}$ for species 1 in the electrolyte.

The observed TOF of bulk electrolysis was determined based on the following equation:

$$TOF = \left(\frac{j_{product}}{nFC_{cat}}\right)^2 \frac{1}{D}.$$

Here $j_{product}$ is the partial current density of product formation in bulk electrolysis, n is the number of electrons required to generate one product molecule, F is the Faraday's constant, $C_{cat}$ is the concentration of catalyst 1, D is the diffusion coefficient of catalyst (about $2.18 \times 10^{-7}$ cm$^2 \cdot$s$^{-1}$ for species 1 as determined above).

Similarly, the TON of bulk electrolysis was determined based on the following equation:

$$TON = \frac{C_{product}V_{solution}}{AC_{cat}}\sqrt{\frac{TOF}{D}}.$$

Here $C_{product}$ is the product concentration after bulk electrolysis, $V_{solution}$ is the total electrolyte volume, A is the electrode area, $C_{cat}$ is the concentration of catalyst 1, D is the diffusion coefficient of catalyst (about $2.18 \times 10^{-7}$ cm$^2 \cdot$s$^{-1}$ for species 1 as determined above), and TOF is the turnover frequency calculated based on above protocol.

Computational methods. All calculations were performed with Turbomole using the M06 density functional. The def2-SVP basis set was used for geometry optimizations and free energy corrections, and the def2-TZVP basis set was used for electronic energies. Solvation was modeled with COSMO with the dielectric constant set to 101. Images were rendered using Chemcraft.

Data analysis of XAS results. X-ray absorption spectra (XAS), including X-ray absorption near edge spectra (XANES) and extended X-ray absorption fine structure (EXAFS), at V K-edge were collected in total-fluorescence-yield mode at ambient conditions at BL17C of National Synchrotron Radiation Center (NSRRC), Hsinchu, Taiwan. Spectra were recorded in the energy range from about −100 eV to about 600 eV, relative to that of V K-edge absorption (about 5465.0 eV). The XAS spectra were processed by subtracting the baseline of pre-edge and normalizing that of post-edge. EXAFS analysis was carried out using Fourier transform on k$^3$-weighted EXAFS oscillations to assess the contribution of each bond pair to Fourier transform peak. The curve fitting of EXAFS spectra was conducted using the software, REX2000, with FEFF program.

TABLE 1

Reaction conditions, turnover frequencies and activation energies of catalytic $CH_4$ functionalization

| Catalysts | Solvent | Oxidant/reactant | Temperature (° C.) | $P_{CH4}$ (bar) |
|---|---|---|---|---|
| 1[c] | 98% $H_2SO_4$ | Echem[d] | 25 | 1 |
| 1[c] | 98% $H_2SO_4$ | Echem[d] | 25 | 3 |
| MMSP or DMSP[f] | 20-60% $SO_3/H_2SO_4$ | $SO_3$ | 50 | ~100 |
| Cp*2ScMe[g] | Cyclohexane | $CH_3CH=CH_2$ | 80 | —[h] |
| (NHC-pym)PdCl$_2$[i] | $CF_3COOH$ | $K_2S_2O_8$ | 90 | 30 |
| $PdSO_4$ | 20% $SO_3/H_2SO_4$ | Echem[k] and $SO_3$ | 70 | ~34 |
| $PdSO_4$ | Concentrated $H_2SO_4$ | Echem[m] | 140 | ~34 |
| $K_2PtCl_4$—$Na_2PtCl_6$ | 0.5M $H_2SO_4$ | Echem[o] | 130 | ~47 |
| [Cu[I]Cu[I]Cu[II](7-N-Etppz)][1+q] | $CH_3CN$ | $O_2$ | 0 | 1 |
| $HgSO_4$ | 100% $H_2SO_4$ | $H_2SO_4$ | 180 | ~35 |
| $PdSO_4$ | 96% $H_2SO_4$ | $H_2SO_4$ | 180 | ~27 |
| $Au_2(SO_4)_3$ | 96% $H_2SO_4$ | $H_2SeO_4$ | 180 | 27 |
| Ir(COD)Cl/dmpe[t] | Cyclohexane | $B_2Pin_2$[u] | 150 | ~34 |
| (bpym)PtCl$_2$[w] | 102% $H_2SO_4$ | $SO_3$ | 220 | 34 |
| Ce(OTf)$_4$[y] | $CH_3CN$ | $CCl_3CH_2OH$ | 25 | 50 |
| (bpym)PtCl$_2$[w] | 20% $SO_3/H_2SO_4$ | $SO_3$ | 215 | ~65 |
| $K_2PtCl_4$ | 20% $SO_3/H_2SO_4$ | $SO_3$ | 215 | ~65 |

| Catalysts | Product | TOF[a] (hr$^{-1}$) | $E_a$[b] (kcal · mol$^{-1}$) | References |
|---|---|---|---|---|
| 1[c] | $CH_3OSO_3H$ | 483 | 10.8[e] | This work |
| 1[c] | $CH_3OSO_3H$ | 1336 | 10.8[e] | This work |
| MMSP or DMSP[f] | $CH_3SO_3H$ | — | ~26.5 | (17) |
| Cp*$_2$ScMe[g] | $(CH_3)_3CH$ | — | 11.4 | (55) |
| (NHC-pym)PdCl$_2$[i] | $CH_3OCOCF_3$ | ~2.4 | 39.5[j] | (56) |
| $PdSO_4$ | $CH_3OSO_3H$ & | ~0.2[l] | — | (21) |

TABLE 1-continued

Reaction conditions, turnover frequencies and activation energies of catalytic $CH_4$ functionalization

|  |  |  |  |  |
|---|---|---|---|---|
|  | $CH_3SO_3H$ | ~1.9[l] | — | (21) |
| $PdSO_4$ | —[n] | 2000 | 25.9 | (21) |
| $K_2PtCl_4$—$Na_2PtCl_6$ | $CH_3X$[p] | 0.29 | — | (22) |
| $[Cu^ICu^ICu^I(7\text{-}N\text{-}Etppz)]^{1+}$[q] | $CH_3OH$ | ~2.8 | — | (57) |
| $HgSO_4$ | $CH_3OSO_3H$ | ~3.6 | 34 [r] | (8) |
| $PdSO_4$ | $CH_3COOH$ | ~3.6 | 27.9 [s] | (58) |
| $Au_2(SO_4)_3$ | $CH_3OSO_3H$ | ~3.6 | 30 | (59) |
| $Ir(COD)Cl/dmpe$[t] | $CH_3Bpin$ [v] | ~6.5 | 25.9 | (12) |
| $(bpym)PtCl_2$[w] | $CH_3OSO_3H$ | ~36 | 36 [x] | (9) |
| $Ce(OTf)_4$[y] | Aryl and Alkyl derivatives | ~161 | — | (60) |
| $(bpym)PtCl_2$[w] | $CH_3OSO_3H$ | 1280 | — | (11) |
| $K_2PtCl_4$ | $CH_3OSO_3H$ | 23400 | — | (11) |

[a] TOF, turnover frequency.
[b] $E_a$, apparent activation energy.
[c] Catalyst concentration is 0.7 mM.
[d] E = 2.255 V vs. $Hg_2SO_4/Hg$.
[e] The value is obtained at E = 2.055 V vs. $Hg_2SO_4/Hg$.
[f] Using as electrophilic initiator, MMSP, monomethylsulfonylperoxide sulfuric acid [HOS(O)$_2$OOS(O)$_2$CH$_3$]; DMSP, bis(methylsulfonyl) peroxide [H$_3$CS(O)$_2$OOS(O)$_2$CH$_3$].
[g] Cp*, cyclopentadiene.
[h] Not specified, it should be ambient pressure.
[i] NHC-pym, N-heterocyclic carbene-pyrimidine.
[j] Value is obtained from other work.
[k] E = 2.0 V vs. $Ag_2SO_4/Ag$.
[l] Calculated by $PdSO_4$ concentration.
[m] Step potentials of 2.0 V followed by 0.5 V vs. $Ag_2SO_4/Ag$.
[n] Proposed yet not experimentally quantified in this specific experiment.
[o] Average current is 1.19 mA for 4.9 h.
[p] $CH_3X$ represents the product of $CH_3OH$ and $CH_3Cl$, products $CH_2(OH)_2$, HCOOH, and $CO_2$ are not included here.
[q] 7-N-Etppz, 3,3'-(1,4-diazepane-1,4-diyl)bis[1-(4-ethylpiperazine-1-yl)propan-2-ol].
[r] Value is obtained from other work.
[s] Value is obtained from other work.
[t] COD, 1,5-cyclooctadiene; dmpe, 1,2-bis(dimethylphosphino)ethane.
[u] $B_2Pin_2$, 4,4,4',4',5,5,5',5'-Octamethyl-2,2'-bi-1,3,2-dioxaborolane.
[v] $CH_3Bpin$, 2,4,4,5,5-pentamethyl-1,3,2-dioxaborolane.
[w] bpym, bipyrimidine.
[x] Value is obtained from other work.
[y] Photocatalysis, OTf, trifluoromethane sulfonate.

TABLE 2

The turnover numbers and Faradaic efficiencies with natural gas as the substrate [a]

| | $C_1$ product | $C_2$ products | | $C_3$ products | | |
|---|---|---|---|---|---|---|
| | $CH_3OSO_3H$ | $CH_3COOH$ | $C_2H_5OSO_3H$ | $CH_3COCH_3$ | $i\text{-}C_3H_7OSO_3H$ | Total [b] |
| TONs [c] | 106,883 | 8,934 | 405 | 216 | —[d] | 116,438 |
| F. E. (%) [e] | 43.8 | 38.0 | 2.6 | 3.9 | —[d] | 88.3 |

[a] 25° C., 0.7 mM 1 in 98% $H_2SO_4$, 1-bar natural gas supplied to UCLA by SoCalGas, E = 2.255 V vs. $Hg_2SO_4/Hg$, 240-hr bulk electrolysis.
[b] Trace amount of products with more than 3 carbons (>$C_3$) were observed yet not included here.
[c] TON, turnover number. The cumulative values after 240-hr electrolysis are reported.
[d] Not detected from $^1H$ NMR.
[e] F. E., Faradaic efficiencies. The reported values are 240-hr averages.

TABLE 3

Comparison of structural information between EXAFS data and DFT calculations [a]

| Results from the analysis of EXAFS data [b] | | | Values from DFT calculations | | | | | | |
|---|---|---|---|---|---|---|---|---|---|
| | | | 1a | | | | 1b | | |
| Shell | C. N. | R (Å) | Shell | C. N. | $R_1$ (Å) | $R_2$ (Å) | Shell | C. N. | R (Å) |
| V—O | 1.1 (0.1) | 1.58 (0.01) | V=O | 1 | 1.53 | 1.53 | V=O | 1 | 1.53 |
| V—O | 1.2 (0.1) | 1.68 (0.02) | V—O | 4 | 1.73 | 1.82 | V—O | 4 | 1.76 |
| V—O | 3.0 (0.1) | 1.96 (0.01) | | | 1.92 | 1.83 | | | 1.86 |
| V—S | 1.0 (0.4) | 2.73 (0.05) | | | 1.96 | 1.93 | | | 2.01 |
| V—S | 2.0 (0.2) | 3.13 (0.07) | | | 2.01 | 1.98 | | | 2.05 |
| V—V | 1.0 (0.2) | 3.27 (0.05) | | | | | | | |

TABLE 3-continued

Comparison of structural information between
EXAFS data and DFT calculations [a]

| V—S | 3 | 2.82 | 3.17 | V—S | 2 | 2.67 |
|---|---|---|---|---|---|---|
|  |  | 3.19 | 3.19 |  |  | 2.85 |
|  |  | 3.20 | 3.23 | V—V | 1 | 3.38 |
| V—V | 1 | 3.14 | 3.14 |  |  |  |

[a] C. N., coordination number; R, distance away from the V atom.
[b] EXAFS data recorded for 10 mM 1 in 98% $H_2SO_4$.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

Other embodiments are set forth in the following claims, along with the full scope of equivalents to which such claims are entitled.

What is claimed is:

1. An electrocatalytic process for conversion of a hydrocarbon reactant, the process comprising:
    introducing the hydrocarbon reactant into an acidic solution in a presence of a catalyst, wherein the catalyst comprises a $d^0$ transition metal-oxo moiety and at least one of a sulfonic moiety or a trifluoromethanesulfonic moiety bonded to the $d^0$ transition metal; and
    applying an electrical input to the catalyst to convert the hydrocarbon reactant into a product.

2. The electrocatalytic process of claim 1, wherein the $d^0$ transition metal is selected from Group 3, Group 4, Group 5, Group 6, and Group 7 of the periodic table.

3. The electrocatalytic process of claim 1, wherein the $d^0$ transition metal is selected from titanium (IV), vanadium (V), and chromium (VI).

4. The electrocatalytic process of claim 1, wherein the catalyst has a chemical formula:

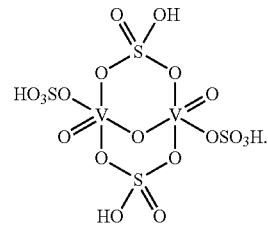

5. The electrocatalytic process of claim 1, wherein a concentration of the catalyst in the acidic solution is in a range of about 0.1 mM to about 100 mM.

6. The electrocatalytic process of claim 1, wherein the acidic solution is an aqueous solution.

7. The electrocatalytic process of claim 6, wherein the aqueous solution includes sulfuric acid.

8. The electrocatalytic process of claim 1, wherein applying the electrical input is carried out at a temperature in a range of up to about 200° C. or less.

9. The electrocatalytic process of claim 1, wherein applying the electrical input is carried out at a pressure in a range of up to about 50 bar or less.

10. The electrocatalytic process of claim 1, wherein the hydrocarbon reactant is a hydrocarbon mixture.

11. The electrocatalytic process of claim 10, wherein the hydrocarbon mixture is natural gas.

12. The electrocatalytic process of claim 1, wherein the hydrocarbon reactant includes methane, and the product includes methyl bisulfate.

* * * * *